United States Patent
Cheng et al.

(10) Patent No.: US 12,069,500 B2
(45) Date of Patent: Aug. 20, 2024

(54) EARLY MEASUREMENT REPORTING

(71) Applicant: QUALCOMM Incorporated, San Diego, CA (US)

(72) Inventors: Peng Cheng, Beijing (CN); Huichun Liu, Beijing (CN); Gavin Bernard Horn, La Jolla, CA (US); Ozcan Ozturk, San Diego, CA (US); Masato Kitazoe, Tokyo (JP); Prasad Reddy Kadiri, San Diego, CA (US); Punyaslok Purkayastha, San Diego, CA (US)

( * ) Notice: Subject to any disclaimer, the term of this patent is extended or adjusted under 35 U.S.C. 154(b) by 432 days.

(21) Appl. No.: 17/422,164

(22) PCT Filed: Jan. 16, 2020

(86) PCT No.: PCT/CN2020/072385
§ 371 (c)(1),
(2) Date: Jul. 9, 2021

(87) PCT Pub. No.: WO2020/147771
PCT Pub. Date: Jul. 23, 2020

(65) Prior Publication Data
US 2022/0116809 A1    Apr. 14, 2022

(30) Foreign Application Priority Data

Jan. 18, 2019  (WO) ................ PCT/CN2019/072370
Feb. 20, 2019  (WO) ................ PCT/CN2019/075550
Mar. 12, 2019  (WO) ................ PCT/CN2019/077770

(51) Int. Cl.
*H04W 24/10* (2009.01)
*H04W 56/00* (2009.01)
(Continued)

(52) U.S. Cl.
CPC .......... *H04W 24/10* (2013.01); *H04W 56/001* (2013.01); *H04W 76/19* (2018.02); *H04W 76/30* (2018.02)

(58) Field of Classification Search
CPC ..... H04W 24/10; H04W 76/19; H04W 76/30; H04W 56/001
See application file for complete search history.

(56) References Cited

U.S. PATENT DOCUMENTS 11,184,785 B2    11/2021    Zacharias et al.
2016/0135103 A1    5/2016    Lee et al.
(Continued)

FOREIGN PATENT DOCUMENTS

CN    108633018 A    10/2018
CN    108810953 A    11/2018
(Continued)

OTHER PUBLICATIONS

Qualcomm Incorporated: "Fast SCell Configuration and Activation Through Network Assisted RRC_Idle Mode Measurements", 3GPP TSG-RAN2 Meeting #99, R2-1710152_Fastscellconfigurationandactivation_QuickmeasrepoRting_V1, 3GPP, Mobile Competence Centre, 650, Route Des Lucioles, F-06921 Sophia-Antipol, vol. RAN WG2, No. Prague, Czech Republic, Oct. 9, 2017-Oct. 13, 2017, Oct. 8, 2017, XP051342219, Sep. 29, 2017, XP051354766, 5 pages, URL:http://www.3gpp.org/ftp/Meetings_3GPPSYNC/RAN2/Docs/.
(Continued)

*Primary Examiner* — Duc C Ho

(57) ABSTRACT

Certain aspects of the present disclosure provide techniques for performing measurement reporting. One aspect is a method for performing measurement reporting at a user equipment, including: receiving, from a master node, a message comprising a measurement configuration for a secondary node; entering an inactive state; performing mea-
(Continued)

surements according to the measurement configuration for the secondary node immediately after entering the inactive state; generating a measurement report based on the measurements; transmitting, to the master node, a radio resource control (RRC) resume request message; receiving, from the master node, an RRC resume message comprising a request for measurement reporting; and transmitting, to the master node, an RRC resume complete message comprising the measurement report; and receiving data from the secondary node.

30 Claims, 21 Drawing Sheets

(51) Int. Cl.
*H04W 76/19* (2018.01)
*H04W 76/30* (2018.01)

(56) References Cited

U.S. PATENT DOCUMENTS

| | | | |
|---|---|---|---|
| 2017/0026938 A1 | 1/2017 | Onggosanusi et al. | |
| 2018/0270682 A1 | 9/2018 | Zacharias et al. | |
| 2018/0352491 A1 | 12/2018 | Shih et al. | |
| 2019/0327647 A1* | 10/2019 | Ozturk | H04W 12/106 |
| 2020/0015074 A1* | 1/2020 | Kim | H04W 12/108 |
| 2020/0037214 A1 | 1/2020 | Jin et al. | |
| 2020/0068452 A1* | 2/2020 | Liao | H04W 72/27 |
| 2020/0396633 A1* | 12/2020 | Tseng | H04W 76/27 |
| 2022/0086688 A1 | 3/2022 | Jin et al. | |
| 2022/0124575 A1 | 4/2022 | Kim et al. | |

FOREIGN PATENT DOCUMENTS

| | | |
|---|---|---|
| CN | 108811020 A | 11/2018 |
| CN | 108924884 A | 11/2018 |
| WO | 2018012811 A1 | 1/2018 |
| WO | 2018174489 A1 | 9/2018 |
| WO | 2018205387 A1 | 11/2018 |

OTHER PUBLICATIONS

Supplementary European Search Report—20742009.2—Search Authority—The Hague—Aug. 1, 2022.
International Search Report and Written Opinion—PCT/CN2019/072370—ISA/EPO—Sep. 26, 2019.
International Search Report and Written Opinion—PCT/CN2019/077770—ISA/EPO—Oct. 22, 2019.
International Search Report and Written Opinion—PCT/CN2019/075550—ISA/EPO—Oct. 9, 2019.
International Search Report and Written Opinion—PCT/CN2020/072385—ISAEPO—Apr. 8, 2020.
Qualcomm Incorporated: "Fast SCell Configuration and Activation Through Network Assisted RRC_Idle Mode Measurements", 3GPP TSG-RAN2 Meeting #99, R2-1707788, Berlin, Germany, Aug. 21-25, 2017, 5 Pages, section 1-3.
VIVO: "Analysis on the Security and Configuration Issues of IDLE State Measurement", 3GPP TAG RAN WG2 Meeting #100, R2-1712832, Reno, USA, Nov. 27-Dec. 1, 2017, 3 Pages, section 1-3.

* cited by examiner

EARLY MEASUREMENT REPORTING

CROSS-REFERENCE TO RELATED CASES

This application is a 371 National Phase Application of International Patent Application No. PCT/CN2020/072385, entitled "Early Measurement Reporting" and filed on Jan. 16, 2020 which claims priority to International Patent Application No. PCT/CN2019/072370, entitled "Early Measurement Reporting" and filed on Jan. 18, 2019, International Patent Application No. PCT/CN2019/075550, entitled "Early Measurement Reporting" and filed on Feb. 20, 2019, and International Patent Application No. PCT/CN2019/077770, entitled "Early Measurement Reporting" and filed on Mar. 12, 2019, the entire contents of each of which is incorporated by reference herein.

INTRODUCTION

Field of the Disclosure

Aspects of the present disclosure relate to wireless communications, and more particularly, to techniques for performing early measurement reporting in wireless communications networks.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. In a first aspect, a method for performing measurement reporting at a user equipment, includes: receiving, from a master node, a message comprising a measurement configuration for a secondary node; entering an idle state; performing measurements according to the measurement configuration for the secondary node immediately after entering the idle state; generating a measurement report based on the measurements; transmitting, to the master node, an indication of an availability of the measurement report; transmitting, to the master node, the measurement report; and receiving data from the secondary node.

In a second aspect, a method for performing measurement reporting, includes: transmitting, from a master node to a user equipment, a message comprising a measurement configuration for a secondary node; receiving, at the master node from the user equipment, an indication of an availability of a measurement report; receiving, at the master node from the user equipment, the measurement report; and transmitting a secondary node addition request to the secondary node.

In a third aspect, a method for performing measurement reporting at a user equipment, includes: receiving, from a master node, a message comprising a measurement configuration for a secondary node; entering an inactive state; performing measurements according to the measurement configuration for the secondary node immediately entering the inactive state; generating a measurement report based on the measurements; transmitting, to the master node, an RRC resume request message; receiving, from the master node, an RRC resume message comprising a request for measurement reporting; transmitting, to the master node, an RRC resume complete message comprising the measurement report; and receiving data from the secondary node.

In a forth aspect, a method for performing measurement reporting, includes: transmitting, from a master node to a user equipment, a message comprising a measurement configuration for a secondary node; receiving, at the master node from the user equipment, an RRC resume request message; transmitting, from the master node to the user equipment, an RRC resume message comprising a request for a measurement report; receiving, at the master node from the user equipment, an RRC resume complete message comprising the measurement report; and transmitting a secondary node addition request to the secondary node.

In a fifth aspect, a method for performing measurement reporting at a user equipment, includes: receiving, from a first master node, a message comprising a measurement configuration for a secondary node; entering an inactive state; performing measurements according to the measurement configuration for the secondary node immediately entering the inactive state; generating a measurement report based on the measurements; transmitting, to a second master node, an RRC resume request message; receiving, from the second master node, an RRC resume message comprising a request for measurement reporting; transmitting, to the second master node, an RRC resume complete message comprising the measurement report; and receiving data from the secondary node.

In a sixth aspect, a method for performing measurement reporting, includes: transmitting, from a first master node to a user equipment, a message comprising a measurement configuration for a secondary node; determining that the user equipment has moved out of range of the first master node; determining that the user equipment is still within a RAN area associated with the first master node and a second master node; receiving, at the second master node from the user equipment, an RRC resume request message; transmitting, from the second master node to the user equipment, an RRC resume message comprising a request for a measurement report; receiving, at the second master node from the user equipment, an RRC resume complete message comprising the measurement report; and transmitting, from the second master node to the secondary node, a secondary node addition request.

In a seventh aspect, a method for transitioning states at a user equipment, includes: receiving, at a user equipment in a first state from a network, a message comprising a new measurement configuration; deleting, by the user equipment, an existing measurement configuration stored at the user equipment; deleting, by the user equipment, an existing measurement result stored at the user equipment; performing, by the user equipment, early measurements according to the new measurement configuration; transitioning, by the user equipment, from the first state to a second state; transitioning, by the user equipment, from the second state to a third state; validating, by the user equipment, the early measurements based on a validity area received from the network; and deleting, by the user equipment, the new measurement configuration.

Other aspects include processing systems configured to perform the aforementioned methods. Further aspects include non-transitory computer-executable media comprising instructions that, when executed by a processor of a processing system, cause the processing to perform the aforementioned methods.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
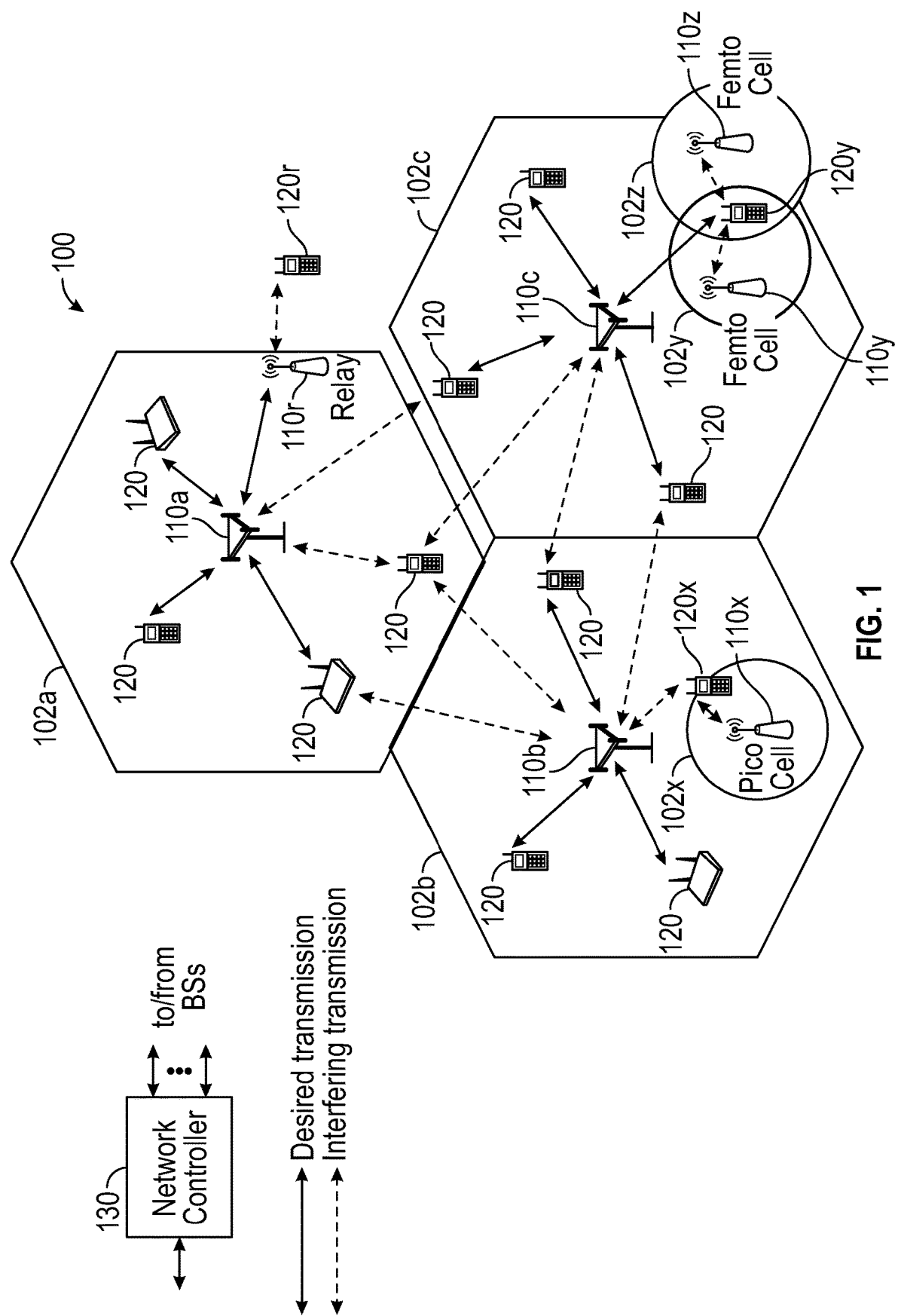
FIG. 1 is a block diagram conceptually illustrating an example telecommunications system, in accordance with certain aspects of the present disclosure.

Aspects of the present disclosure provide apparatus, methods, processing systems, and computer readable mediums for performing early measurement reporting in wireless communications networks.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network configured to perform the methods for early measurement reporting, such as those described below with respect to FIGS. 7-20.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink.

A finely dashed line with double arrows indicates interfering transmissions between a UE and a BS.

Figure 2:
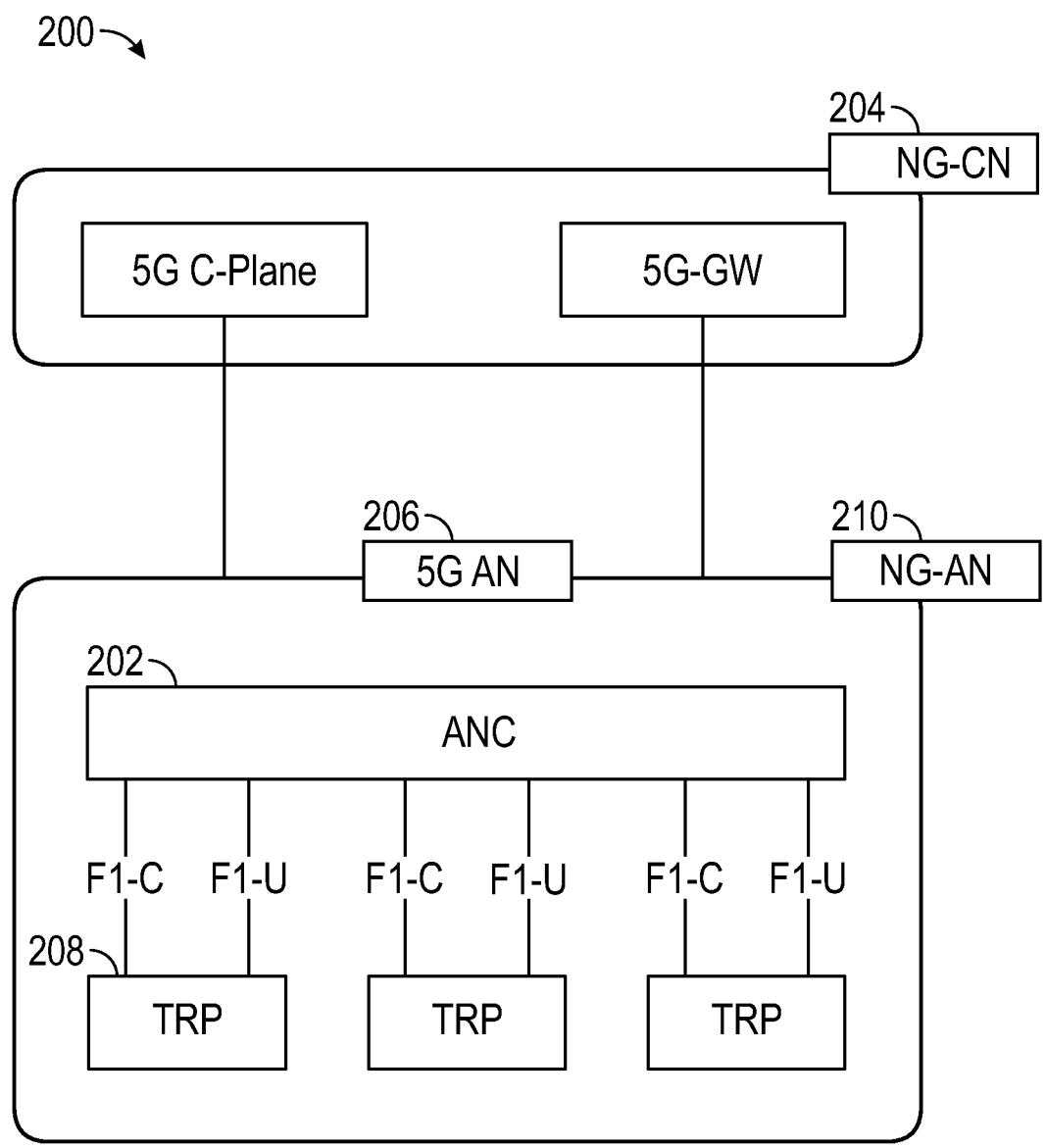
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
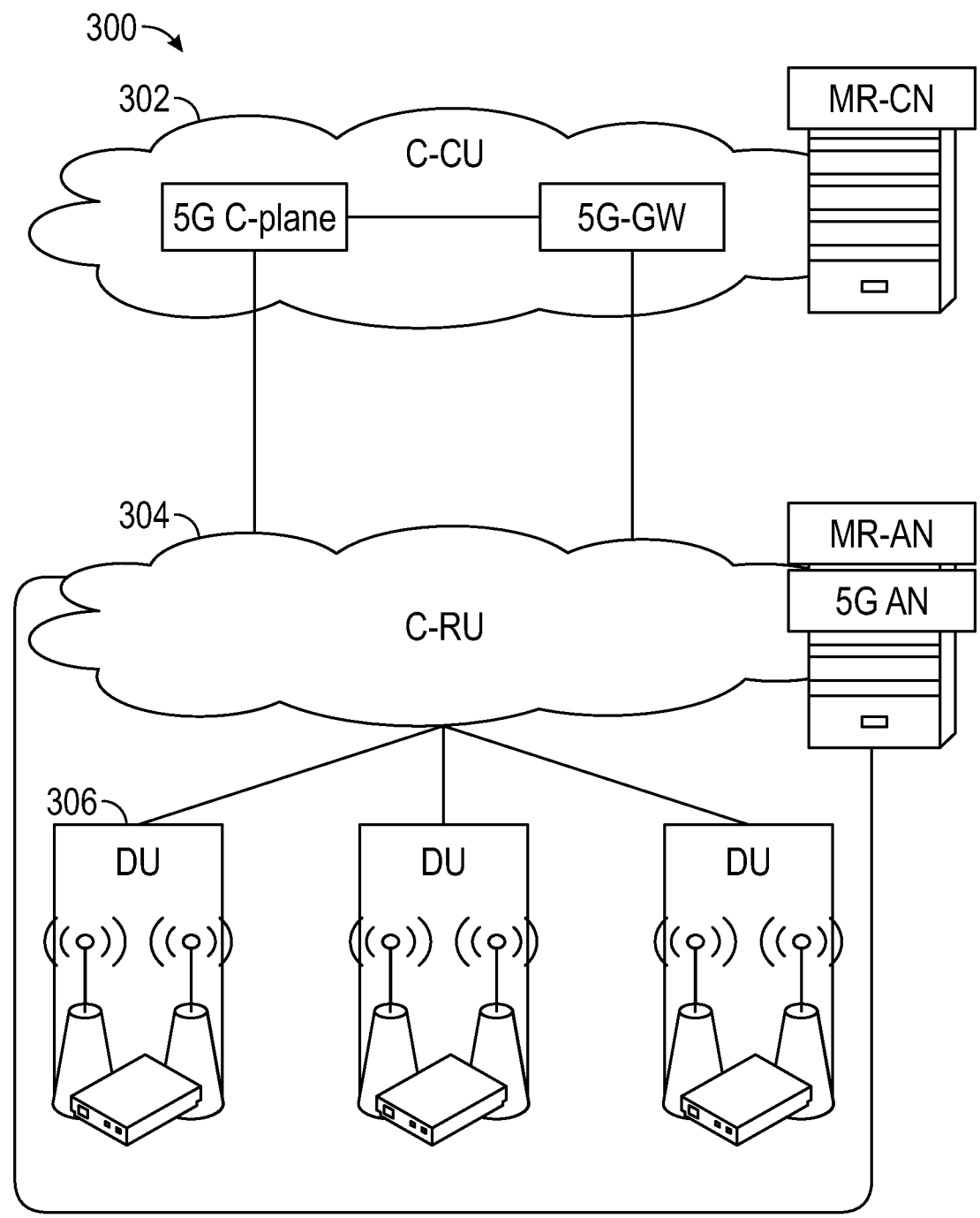
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
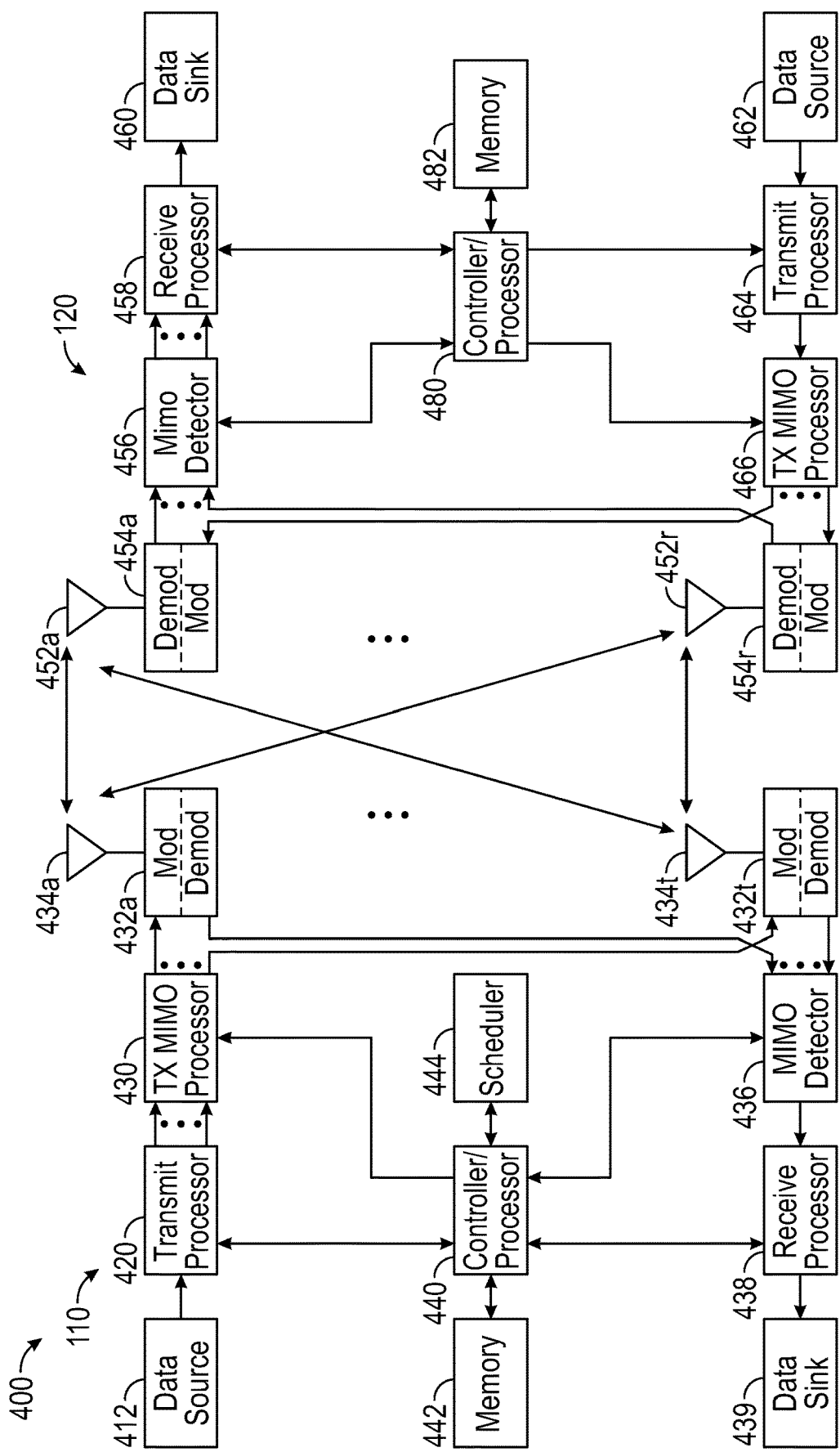
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein, such as those methods for performing early measurement reporting as described below with respect to FIGS. 7-20.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
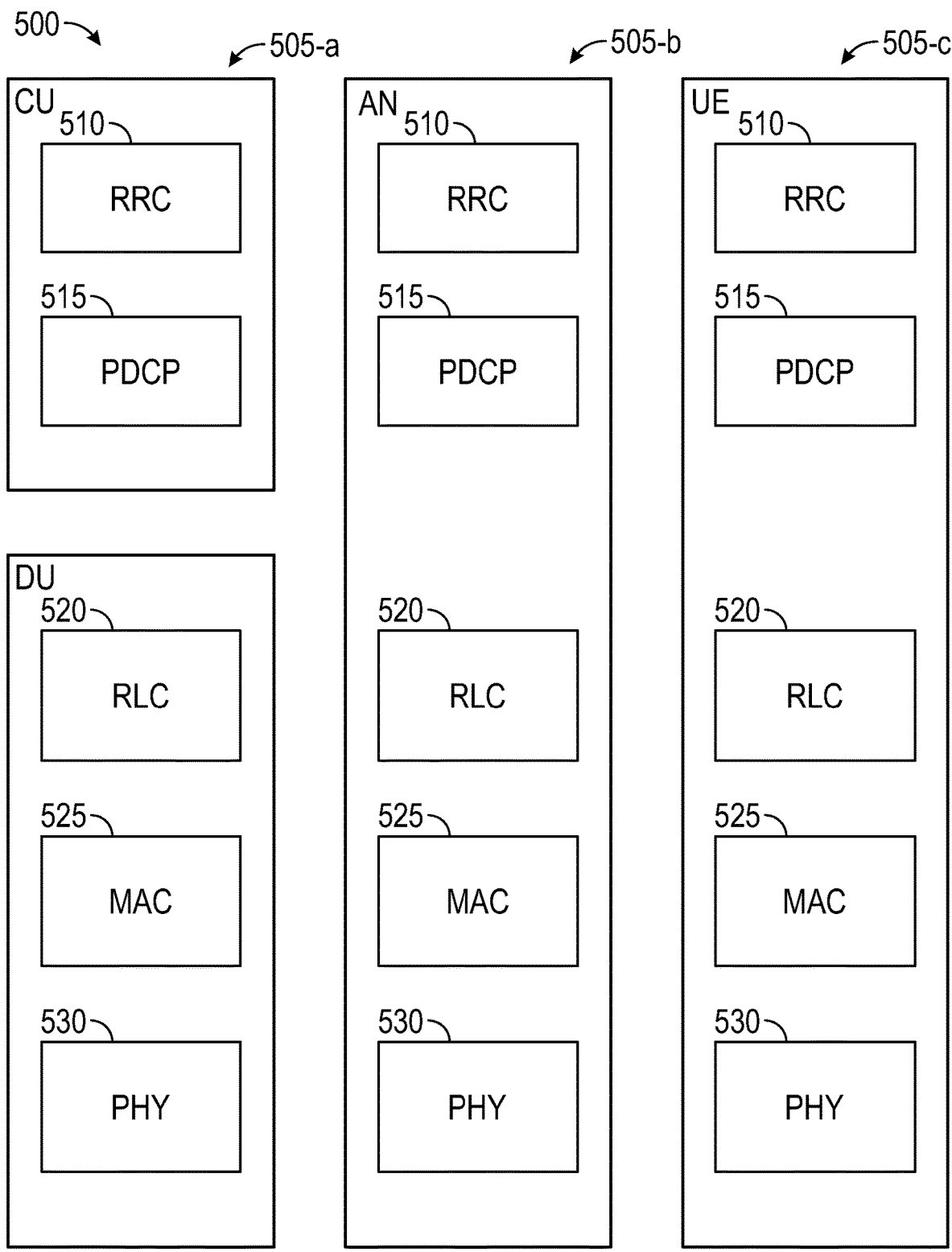
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
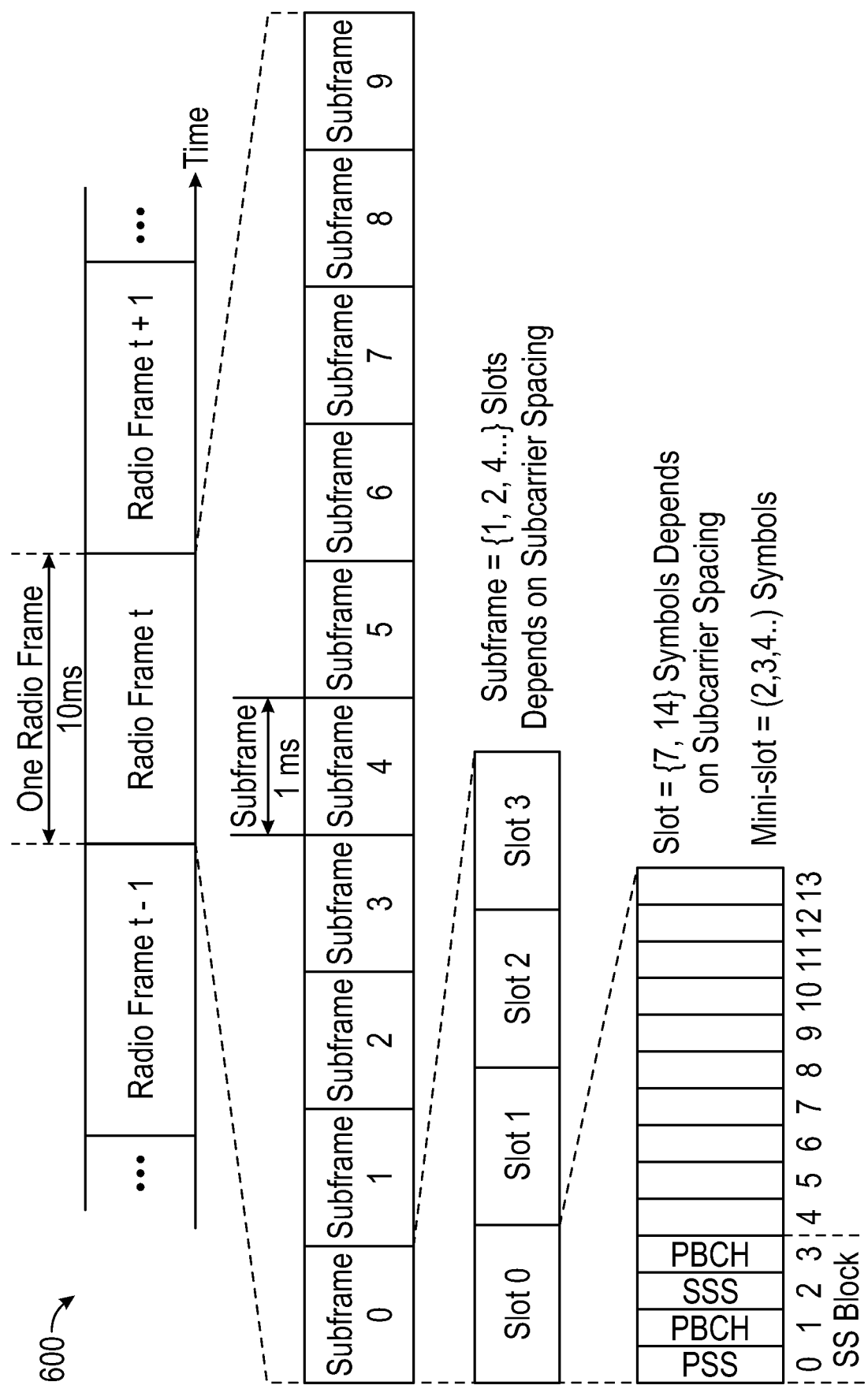
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Methods for Performing Early Measurement Reporting

When a UE exits an idle or inactive state, it may perform a procedure to reestablish a data connection with the network. In some cases, a long radio resource control (RRC) configuration latency may be observed when performing this procedure. For example, in some cases, an idle UE may take around 237 ms to be configured for data transmission after exiting the idle state. Similarly, an inactive UE may take around 213 ms to be configured for data transmissions after exiting the inactive state (which is slightly faster owing to not needing to perform security mode command (SMC) procedures when exiting the inactive state). Reduction of these latencies is beneficial for performance of the UE.

The early measurement reporting methods discussed herein beneficially avoid long measurement durations, which in-turn reduces the time a UE must keep its radio on thereby reducing thermal power consumption.

Similar to some later releases of LTE, in NR, UEs can receive early measurement configurations in RRC release messages or system information broadcast (SIB) messages, which allows the UE to perform measurements in an idle or inactive state. Further, to support multi-radio access technology dual connectivity (MRDC), the RRC release message or SIB message can include measurement configurations for one or more radio access technologies (RATs), such as: (1) both NR and LTE, only NR, or only LTE. In this way, various MRDC configurations can be supported, such as NR-NR (where the master node and the secondary nodes are 5G gNBs), E-UTRA—NR Dual Connectivity (EN-DC) (where the master node is a 4G ng-eNB and the secondary node is a 5G gNB), and NR-E-UTRA Dual Connectivity (NE-DC) (where the master node is a 5G gNB and the secondary node is a 4G ng-eNB), to name a few. In dual connectivity scenarios, the secondary node may forward its early measurement configuration to the master node via an inter-node RRC message.

Given this capability, other NR-specific features can be utilized to further reduce latency of the RRC configuration procedure after existing the idle or inactive state. For example, as described in more detail below, early measurement reporting methods may beneficially reduce the latency of the RRC configuration procedure so that UEs may receive data via NR networks more quickly after exiting an idle or inactive state.

NR networks support at least two types of references signals, including synchronization signal blocks (SSB) and channel state information reference signals (CSI-RS), to perform radio resource management (RRM).

In SSB-based RRM, one synchronization signal block includes one symbol of a primary synchronization signal, one symbol of a secondary synchronization signal, and two or more symbols of a physical broadcast channel that are time division multiplexed. Generally, the transmission of synchronization signal blocks within a synchronization signal burst set is confined to a 5 ms window regardless of synchronization signal burst set periodicity. SSB-based measurement timing configuration (SMTC) includes a network configuring a SMTC window duration (e.g., 1, 2, 3, 4, or 5 ms), a SMTC window timing offset (e.g., 0, 1, SMTC periodicity-1 ms), and an SMTC periodicity (e.g., 5, 10, 20, 40, 80, 160 ms).

In CSI-RS based RRM, a UE-specific CSI-RS is used for L3 mobility, and no cell specific CSI-RS need be specified. CSI-RS for L3 mobility is based on periodic CSI-RS.

As discussed in more detail below, the early measurement methods discussed herein generally include transmitting from a network and receiving at a UE an early measurement configuration prior to entering an idle or inactive state.

In some implementations, the measurement configuration may be provided to the UE, for example, in a radio resource control (RRC) release message or a system information broadcast (SIB) message. In some implementations, the early measurement configuration may be provided in a separate NR SIB (e.g. SIB10) which can be on-demand acquired with short periodicity, to reduce acquisition latency. The configuration for a SIB message would be almost the same as the RRC release message, except that the SIB message would not need a timer and a validity area would only include nodes for an idle UE (because the validity area is not applicable to inactive UEs in this context).

In some implementations, the early measurement configuration may include frequencies of NR secondary nodes (or cells), where each secondary node frequency may include one or more of the following attributes: a band indicator (e.g., an absolute radio frequency channel number (ARFCN), which may be in sync raster or not in sync raster); an SSB Measurement Time Configuration (SMTC) (for SSB-based measurement reports), a threshold and beam number to derive cell quality; a reporting of quantities for cell/beam measurements, such as reference signal received power (RSRP), reference signal received quality (RSRQ), or both; an indication of layer 3 (L3) beam measurements (e.g., number or beam index only or beam index and beam quantities); a threshold and beam number for L3 beam reporting; a measurement cell list (such that a UE only measures secondary nodes included in this list); subcarrier spacing of synchronization signal blocks (SSBs) to be measured; a bitmap of transmitted SSBs to be measured; an NR frequency band number; and an SSB-RSSI measurement configuration. Note that in some cases, the secondary node frequency list may span multiple RAN notification areas (RNAs).

In some implementations, the bitmap of transmitted SSBs to be measured is configured to indicate the set of SSBs to be measured within the SMTC measurement duration. Further, the bitmap of transmitted SSBs to be measured may be frequency range-specific. Thus, in some implementations, multiple frequency-specific bitmaps of transmitted SSBs to be measured may be received by the UE, such as in the following example format:

| SSB-ToMeasure ::= | CHOICE { |
|---|---|
| shortBitmap | BIT STRING (SIZE (4)) |
| mediumBitmap | BIT STRING (SIZE (8)) |
| longBitmap | BIT STRING (SIZE (64)) |
| } | |

In some implementations, the shortBitmap may relate to frequencies less than or equal to 3 GHz, the mediumBitmap may relate to frequencies greater than 3 GHz and less than 6 GHz, and the longBitmap may refer to frequencies greater than 6 GHz. Further, in some implementations, each bit in the bitmap that has a value of 1 may indicate that the UE needs to measure a particular SSB.

In some implementations, the NR frequency band number is used by the UE to choose the correct band filter for SSB measurement in a given ARFCN. This is useful because, unlike LTE, the NR ARFCN value (ARFCN-ValueNR) does not encode the band number. Thus, the UE may not be able to derive the band number from ARFCN value in case of overlapping bands. In some implementations, the NR frequency band number may be in the following example format:

FreqBandIndicatorNR::=INTEGER (1 . . . 0.1024)

In some implementations, the SSB-RSSI measurement configuration indicates in which slot of the configured SMTC to perform RSSI measurements, which may be in the following example format:

```
SSB-RSSI-Measurement : :=          SEQUENCE {
measurementSlots          BIT STRING (SIZE (1. .80))
endSymbol                 INTEGER(0. .3)
}
```

In some implementations, the early measurement configuration may further include a node (or cell) quantity threshold, such as RSRP/RSRQ. If one secondary node's quality is below the threshold, the UE will not report a measurement.

In some implementations, the early measurement configuration may further include a timer (e.g., timer T331) to control how long a UE can perform idle or inactive mode measurements, which helps with UE power saving (because the UE stops measurements when the timer expires).

In some implementations, the early measurement configuration may further include a validity area such that if the UE reselects to a cell/RNA outside this list, the measurements are no longer required. For example, an idle state UE may use a cell list whereas an inactive state UE may use a cell list or RNA list or TA list. As one solution, a flag can be included in the RRC Release message with a suspend configuration for RRC inactive UEs. When the flag is set to "true", the UE will regard the validity area as the assigned RNA list in the same RRC Release message.

In some implementations, the early measurement configuration may further include a beam measurement results validity timer configured to control how long a UE keeps beam measurement results. For example, the beam measurement results validity timer may be configured to start when the UE stops beam measurements. In some implementations, the early measurement configuration may include a plurality of frequency range-specific beam measurement results validity timers (e.g., a first beam measurement results validity timer for a first frequency range and a second beam measurement results validity timer for a second frequency range). This may be useful because different frequency ranges may have different characteristics that affect how long their measurements stay valid. When a beam measurement results validity timer expires, the UE may regard the beam measurement results outdated and discard them in order to beneficially reduce memory usage.

In some implementations, the early measurement configuration may further include one or more L3 filter coefficients. For example, a first set of L3 filter coefficients may be configured for a first frequency range and a second set of L3 filter coefficients may be configured for a second frequency range. Further, for each beam filter coefficient set, beam RSRP and RSRQ can configure different filter coefficients. In one example, the following form may be used:

```
filterCoefficientRSRP        FilterCoefficient    Default fc4
filterCoefficientRSRQ        FilterCoefficient    Default fc4
FilterCoefficient : :=   ENUMERATED { fc0, fc1, fc2, ...,
    fc19, spare1, ... }
```

Any combination of early measurement configurations, such as those described above, can be included in (1) both an RRC Release message and SIB message; (2) only in RRC Release message; or (3) only in SIB message. However, in some implementations, it may be preferable to include a beam validity timer, a layer 3 (L3) beam filter, and a validity timer (e.g., configured to control how long the user equipment can perform measurements in the idle or inactive state, such as T331) in an RRC Release message, such as when the early measurement configurations are split across both the RRC Release message and a SIB message.

Notably, for an inactive UE, the measurement configuration is stored in AS context or suspendConfiguration by the UE and network.

In some implementations, the network indicates whether to support early measurement reporting in an NR SIB message, such as NR SIB1 or NR SIB2.

After receiving the measurement configuration (e.g., either by RRC release message or by SIB message), a UE may start L3 measurements immediately upon entering an idle or inactive state.

Thereafter, the UE can provide the network with early measurement report to speed the setup of a data connection with the network. As described in more detail below, the UE may exchange early measurement reporting messages with the UE in different ways depending on whether the UE is emerging from an idle or inactive state.

Figure 7:
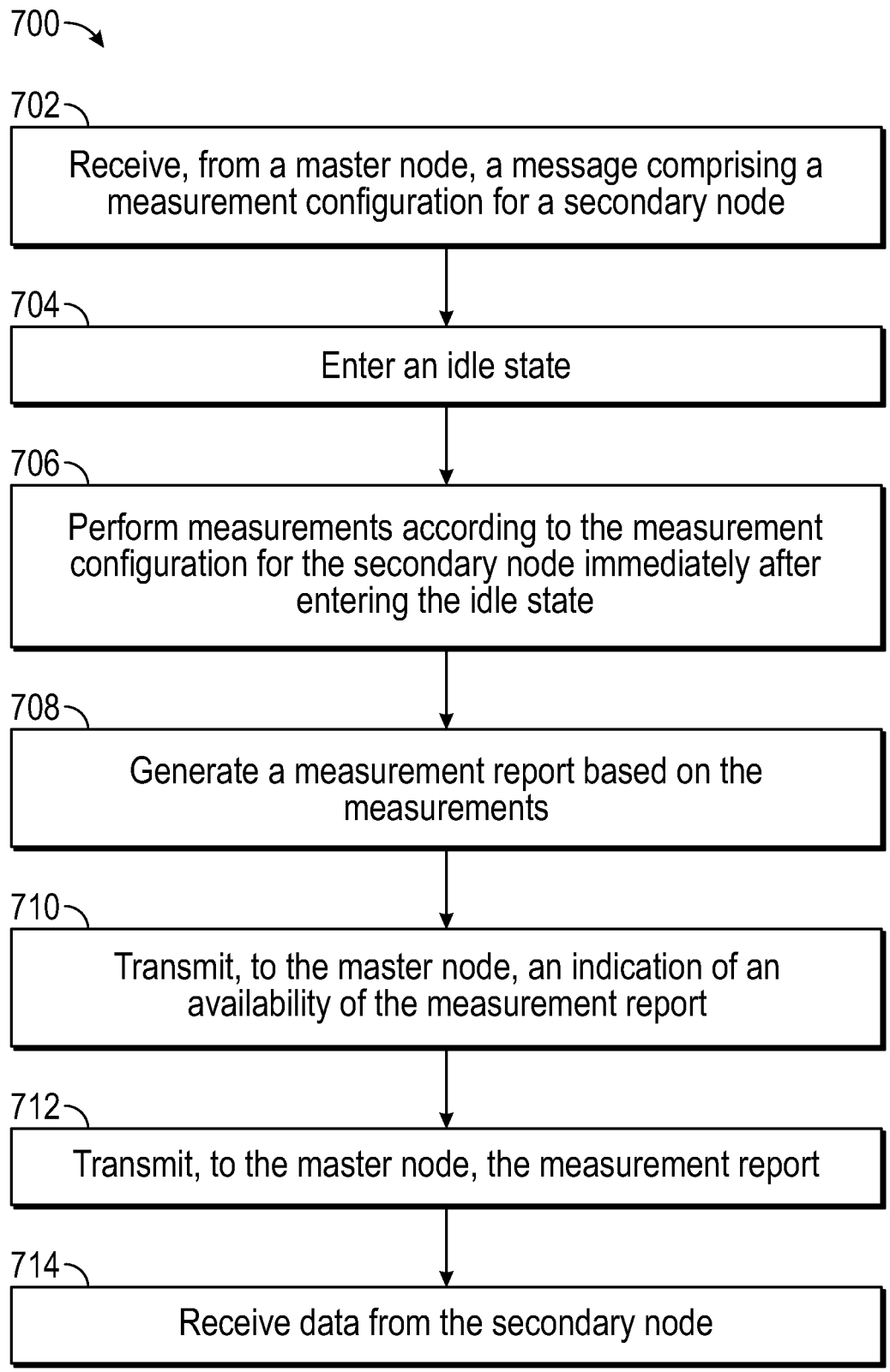
FIG. 7 depicts an example method for performing measurement reporting at a user equipment.

FIG. 7 depicts an example method 700 for performing measurement reporting at a user equipment.

Method 700 begins at step 702 with receiving, from a master node, a message comprising a measurement configuration for a secondary node.

In some implementations, the message comprising the measurement configuration comprises a radio resource control (RRC) release message. In some implementations, the RRC release message may comprises one or more of: a frequency associated with the secondary node; an SSB measurement time configuration (SMTC) associated with the secondary node; a cell quality threshold; a timer configured to control how long the user equipment can perform measurements in the idle state; or a validity area. In some implementations, the RRC release message may further comprise an indication of whether the measurement configuration is configured for both an idle state and an inactive state, or only for an inactive state.

In some implementations, the message comprising the measurement configuration comprises a system information broadcast (SIB) 4 message. In other implementations, the message comprising the measurement configuration comprises a system information broadcast (SIB) message with a periodicity shorter than a SIB4 message. For example, a SIB10 message may be used.

Method 700 then proceeds to step 704 with entering an idle state.

Method 700 then proceeds to step 706 with performing measurements according to the measurement configuration for the secondary node immediately after entering the idle state. In some implementations, the user equipment performs measurements based on the received measurement configuration until a timer expires, such as a T331 timer.

Method 700 then proceeds to step 708 with generating a measurement report based on the measurements.

Method 700 then proceeds to step 710 with transmitting, to the master node, an indication of an availability of the measurement report.

In some implementations, the indication of an availability of the measurement report is included in an RRC setup request message. In some implementations, the indication of an availability of the measurement report is included in an RRC setup complete message.

Method 700 then proceeds to step 712 with transmitting, to the master node, the measurement report.

In some implementations, transmitting, to the master node, the measurement report comprises transmitting an RRC measurement report message. In some implementations, transmitting, to the master node, the measurement report comprises transmitting an RRC setup complete message comprising the measurement report.

Method 700 then proceeds to step 704 with receiving data from the secondary node.

Though not depicted in FIG. 7, method 700 may further include receiving, from the master node, a request for the measurement report prior to transmitting, to the master node, the measurement report.

In some implementations, the request for the measurement report comprises an RRC setup message.

In some implementations, the request for the measurement report comprises an uplink information request message and transmitting, to the master node, the measurement report comprises transmitting an uplink information response message comprising the measurement report. In some implementations, the uplink information response message comprises an RRC setup complete message.

In some implementations, method 700 may further comprise transmitting, to the master node, a beam measurement report.

In some implementations, method 700 may further comprise sending, to the master node, a preamble comprising a request for the SIB message prior to receiving the message comprising the SIB message.

In some implementations, method 700 may further comprise deleting an existing measurement configuration and an existing measurement result after receiving the message comprising the measurement configuration for the secondary node. This may occur, for example, before performing measurements according to the received measurement configuration in step 706.

In some implementations, method 700 may further comprise validating the measurements (e.g., performed at step 706) based on the validity area (e.g., received with the measurement configuration at step 702).

Figure 8:
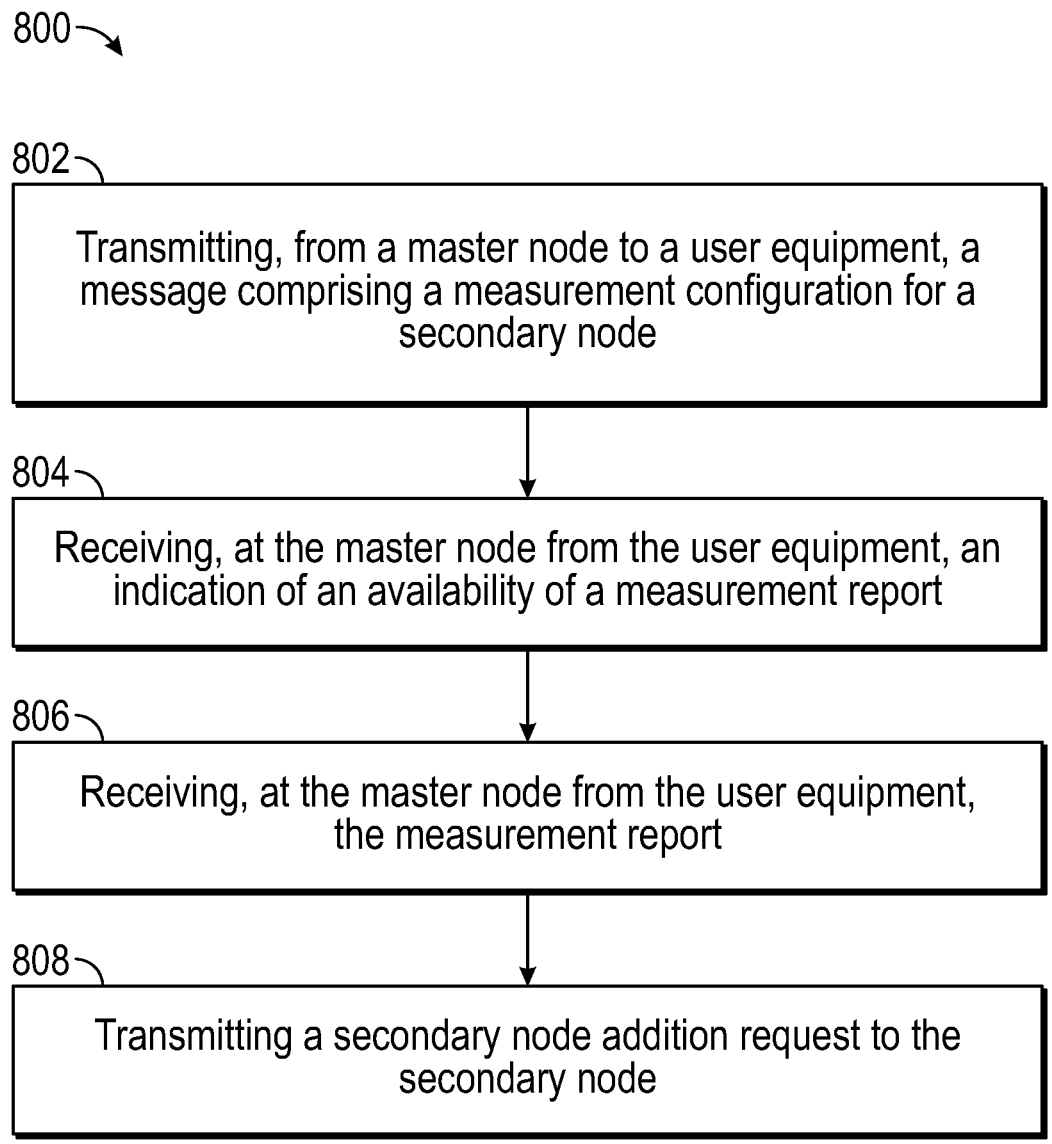
FIG. 8 depicts a method for performing measurement reporting.

FIG. 8 depicts an example method 800 for performing measurement reporting.

Method 800 begins at step 802 with transmitting, from a master node to a user equipment, a message comprising a measurement configuration for a secondary node.

In some implementations, the message comprising the measurement configuration comprises a radio resource control (RRC) release message. In some implementations, the RRC release message comprises one or more of: a frequency associated with the secondary node; an SSB measurement time configuration (SMTC) associated with the secondary node; a cell level measurement configuration including threshold and maximum beam number to derive cell quality; a layer 3 beam level measurement configuration including threshold and maximum beam number for reporting; a cell quality threshold; a timer configured to control how long the user equipment can perform measurements in an idle state; or a validity area. In some implementations, the validity area comprises a list of cell identifiers. In some implementations, the RRC release message may further comprise an indication of whether the measurement configuration is configured for both an idle state and an inactive state, or only for an inactive state.

In some implementations, the message comprising the measurement configuration (e.g., RRC release message or SIB message) further comprises one or more of: a subcarrier spacing of synchronization signal blocks (SSBs) to be measured; a bitmap of transmitted SSBs to be measured; an NR frequency band number; an SSB-RSSI measurement configuration; a beam measurement results validity timer; or one or more L3 filter coefficients.

In some implementations, the message comprising the measurement configuration comprises a system information broadcast (SIB) 4 message. In other implementations, the message comprising the measurement configuration comprises a system information broadcast (SIB) message with a periodicity shorter than a SIB4 message. For example, a SIB10 message may be used.

Method 800 then proceeds to step 804 with receiving, at the master node from the user equipment, an indication of an availability of a measurement report. In some implementations, the indication of an availability of the measurement report is included in an RRC setup request message. In some implementations, the indication of an availability of the measurement report is included in an RRC setup complete message.

Method 800 then proceeds to step 806 with receiving, at the master node from the user equipment, the measurement report.

In some implementations, receiving, at the master node from the user equipment, the measurement report comprises receiving an uplink information response message comprising the measurement report. In some implementations, the uplink information response message comprises an RRC setup complete message.

In other implementations, receiving, at the master node from the user equipment, the measurement report comprises receiving an RRC measurement report message.

Method 800 then proceeds to step 808 with transmitting a secondary node addition request to the secondary node.

Though not depicted in FIG. 8, method 800 may further comprise: receiving, at the master node from the secondary node, an inter-node radio resource control (RRC) message comprising the measurement configuration.

In some implementations, method 800 further comprises: transmitting, from the master node to the user equipment, a request for the measurement report prior to receiving, at the master node from the user equipment, the measurement report. In some implementations, the request for the measurement report comprises an uplink information request message. In some implementations, the uplink information request message comprises an RRC setup message.

In some implementations, method 800 further comprises: receiving, at the master node, a preamble comprising a request for the SIB message prior to transmitting the message comprising the SIB message.

In some implementations, method 800 further comprises: receiving, at the master node from the user equipment, a beam measurement report.

Figure 9:
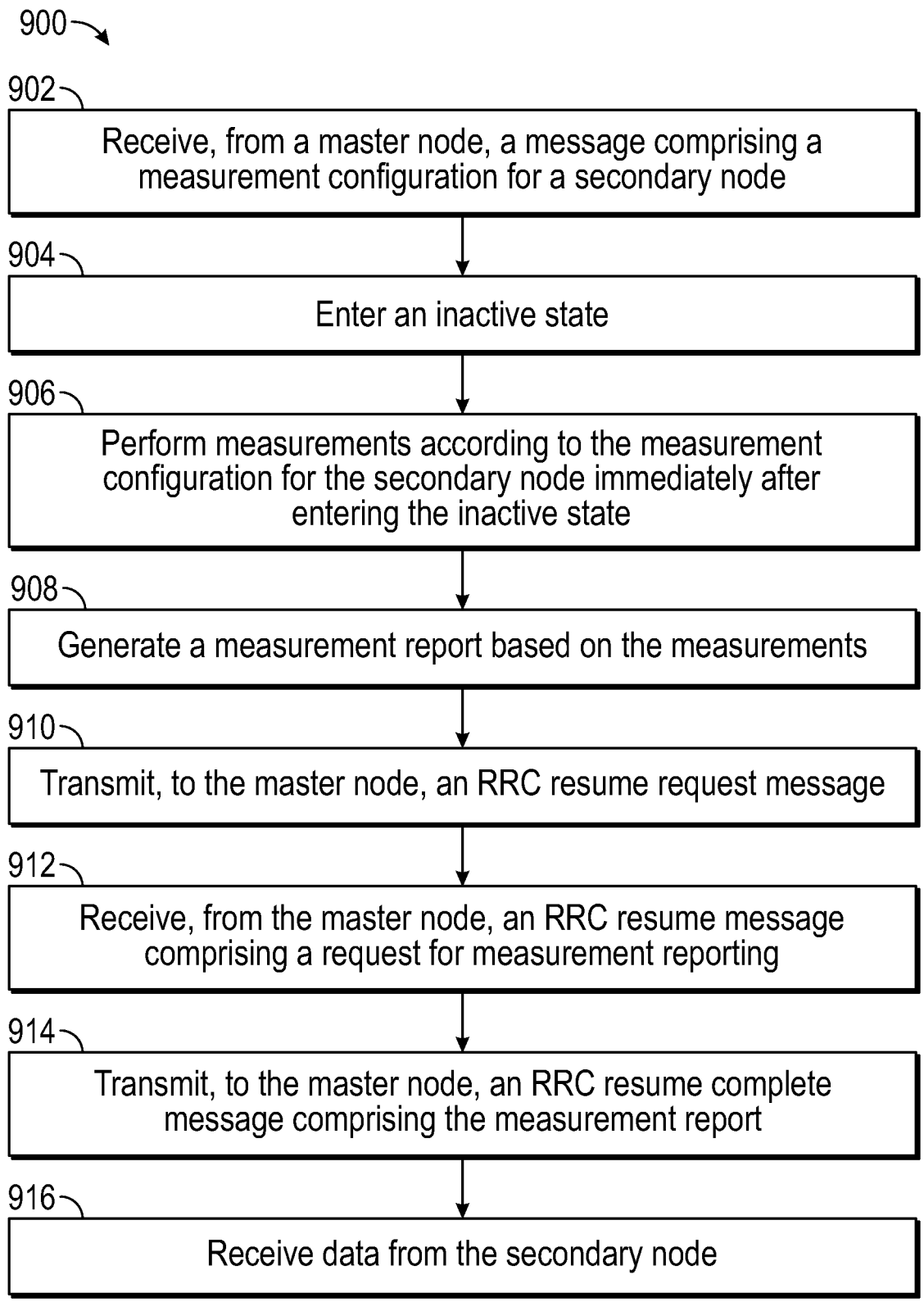
FIG. 9 depicts an example method for performing measurement reporting at a user equipment.

FIG. 9 depicts an example method 900 for performing measurement reporting at a user equipment.

Method 900 begins at step 902 with receiving, from a master node, a message comprising a measurement configuration for a secondary node.

In some implementations, the message comprising the measurement configuration comprises a radio resource control (RRC) release message. In some implementations, the RRC release message comprises one or more of: a frequency associated with the secondary node; an SSB measurement time configuration (SMTC) associated with the secondary node; a cell quality threshold; a timer configured to control how long the user equipment can perform measurements in the inactive state; or a validity area. In some implementations, the validity area comprises a list of cell identifiers. In some implementations, the validity area comprises a list of RAN notification areas (RNAs). In some implementations, the validity area comprises a list of tracking areas (TAs). In some implementations, the RRC release message may further comprise an indication of whether the measurement configuration is configured for both an idle state and an inactive state, or only for an inactive state In some implementations, the message comprising the measurement configuration (e.g., RRC release message or SIB message) further comprises one or more of: a subcarrier spacing of synchronization signal blocks (SSBs) to be measured; a bitmap of transmitted SSBs to be measured; an NR frequency band number; an SSB-RSSI measurement configuration; a beam measurement results validity timer; or one or more L3 filter coefficients.

In some implementations, the message comprising the measurement configuration comprises a system information broadcast (SIB) 4 message. In some implementations, the message comprising the measurement configuration comprises a system information broadcast (SIB) message with a periodicity shorter than a SIB4 message. For example, a SIB10 message may be used.

Method 900 then proceeds to step 904 with entering an inactive state.

Method 900 then proceeds to step 906 with performing measurements according to the measurement configuration for the secondary node immediately entering the inactive state. In some implementations, the user equipment performs measurements based on the received measurement configuration until a timer expires, such as a T331 timer.

Method 900 then proceeds to step 908 with generating a measurement report based on the measurements.

Method 900 then proceeds to step 910 with transmitting, to the master node, an RRC resume request message.

In some implementations, the RRC resume request message comprises an in indication that the measurement report is available.

Method 900 then proceeds to step 912 with receiving, from the master node, an RRC resume message comprising a request for measurement reporting.

Method 900 then proceeds to step 914 with transmitting, to the master node, an RRC resume complete message comprising the measurement report.

Method 900 then proceeds to step 916 with receiving data from the secondary node.

Though not depicted in FIG. 9, in some implementations method 900 further comprises transmitting, to the master node, a beam measurement report.

In some implementations, method 900 further comprises: sending, to the master node, a preamble comprising a request for the SIB message prior to receiving the message comprising the SIB message.

In some implementations, method 900 may further comprise deleting an existing measurement configuration and an existing measurement result after receiving the message comprising the measurement configuration for the secondary node. This may occur, for example, before performing measurements according to the received measurement configuration in step 906.

In some implementations, method 900 may further comprise validating the measurements (e.g., performed at step 906) based on the validity area (e.g., received with the measurement configuration at step 902).

Figure 10:
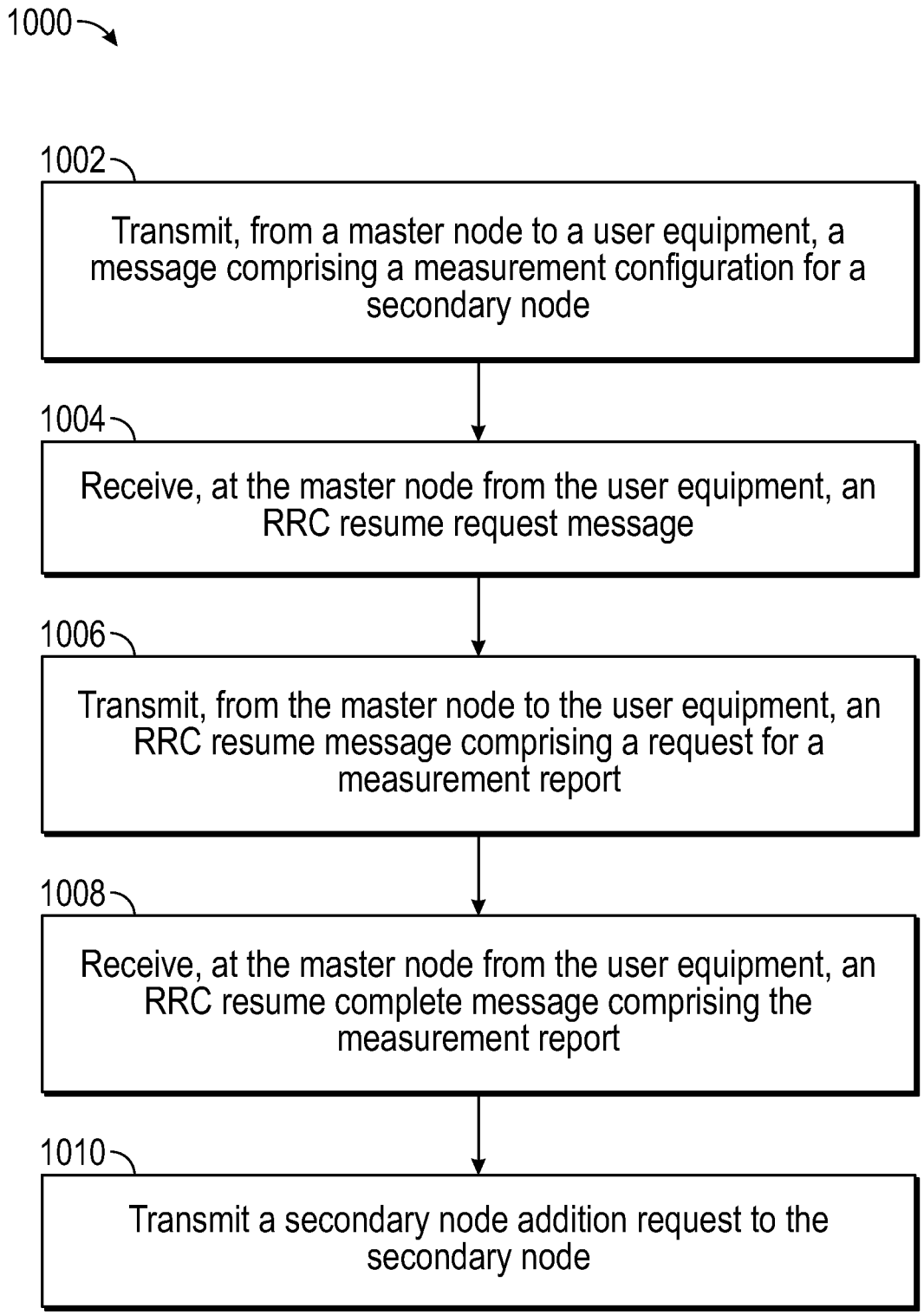
FIG. 10 depicts an example method for performing measurement reporting.

FIG. 10 depicts an example method 1000 for performing measurement reporting.

Method 1000 begins at step 1002 with transmitting, from a master node to a user equipment, a message comprising a measurement configuration for a secondary node.

In some implementations, the message comprising the measurement configuration comprises a radio resource control (RRC) release message. In some implementations, the RRC release message comprises one or more of: a frequency associated with the secondary node; an SSB measurement time configuration (SMTC) associated with the secondary node; a cell level measurement configuration including threshold and maximum beam number to derive cell quality; a layer 3 beam level measurement configuration including threshold and maximum beam number for reporting; a cell quality threshold; a timer configured to control how long the user equipment can perform measurements in an inactive state; or a validity area. In some implementations, the RRC release message may further comprise an indication of whether the measurement configuration is configured for both an idle state and an inactive state, or only for an inactive state In some implementations, the message comprising the measurement configuration (e.g., RRC release message or SIB message) further comprises one or more of: a subcarrier spacing of synchronization signal blocks (SSBs) to be measured; a bitmap of transmitted SSBs to be measured; an NR frequency band number; an SSB-RSSI measurement configuration; a beam measurement results validity timer; or one or more L3 filter coefficients.

In some implementations, the validity area comprises a list of cell identifiers. In some implementations, the validity area comprises a list of RAN notification areas (RNAs). In some implementations, the validity area comprises a list of tracking areas (TAs).

In some implementations, the message comprising the measurement configuration comprises a system information broadcast (SIB) 4 message. In some implementations, the message comprising the measurement configuration comprises a system information broadcast (SIB) message with a periodicity shorter than a SIB4 message. For example, a SIB10 message may be used.

Method 1000 then proceeds to step 1004 with receiving, at the master node from the user equipment, an RRC resume request message.

In some implementations, the RRC resume request message comprises an indication that the measurement report is available.

Method 1000 then proceeds to step 1006 with transmitting, from the master node to the user equipment, an RRC resume message comprising a request for a measurement report.

Method 1000 then proceeds to step 1008 with receiving, at the master node from the user equipment, an RRC resume complete message comprising the measurement report.

Method 1000 then proceeds to step 1010 with transmitting a secondary node addition request to the secondary node.

Though not depicted in FIG. 10, in some implementations, method 1000 further comprises receiving, at the master node from the secondary node, an inter-node radio resource control (RRC) message comprising the measurement configuration.

In some implementations, method 1000 further comprises receiving, at the master node from the user equipment, a beam measurement report.

In some implementations, method 1000 further comprises receiving, at the master node, a preamble comprising a request for the SIB message prior to transmitting the message comprising the SIB message.

In some implementations, the RRC resume request message comprises a user equipment identification, and method 1000 further comprises determining, based on the user equipment identification, that the user equipment supports early measurement reporting.

Figure 11:
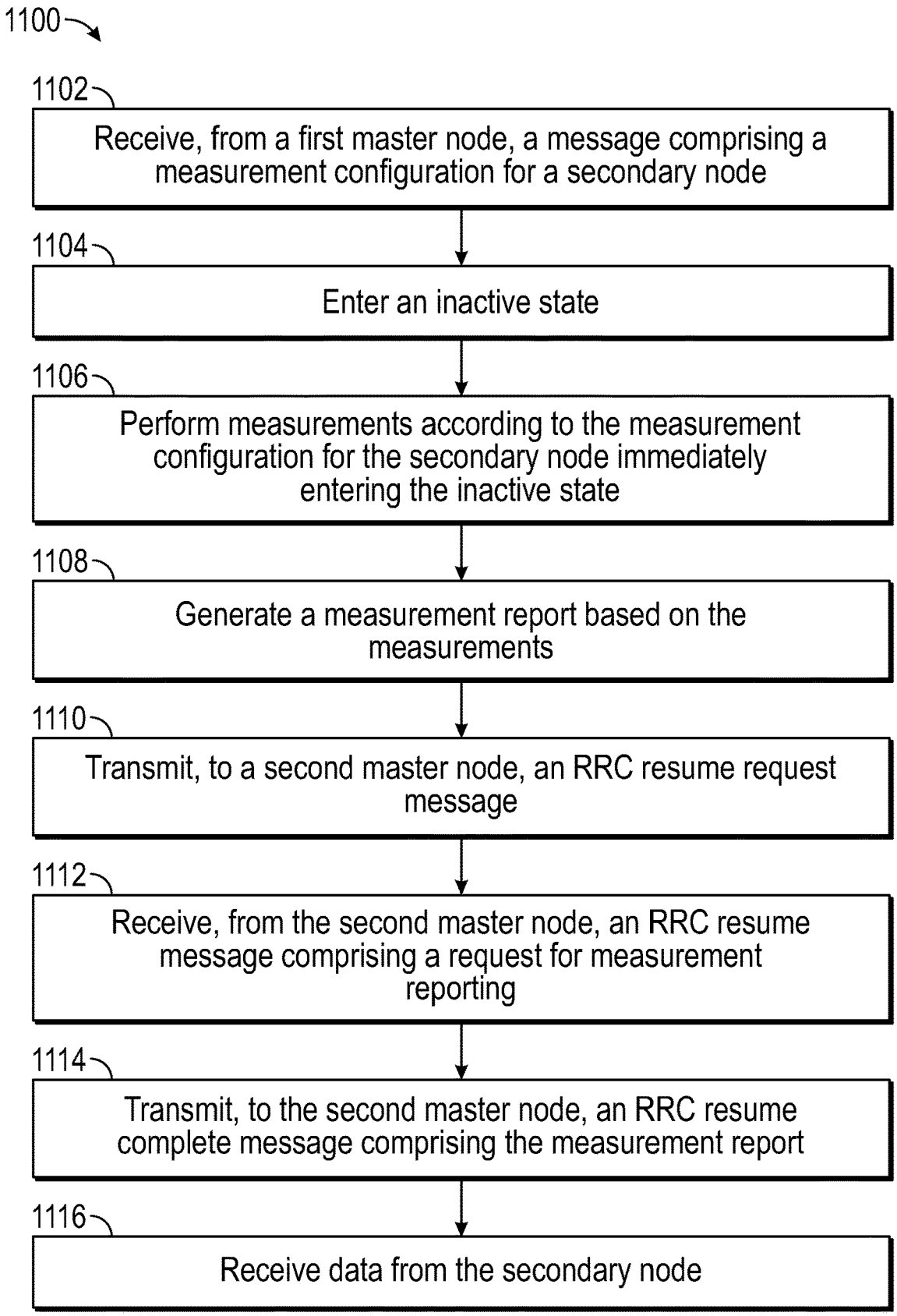
FIG. 11 depicts an example method for performing measurement reporting at a user equipment.

FIG. 11 depicts an example method 1100 for performing measurement reporting at a user equipment.

Method 1100 begins at step 1102 with receiving, from a first master node, a message comprising a measurement configuration for a secondary node.

In some implementations, the message comprising the measurement configuration comprises a radio resource control (RRC) release message. In some implementations, the RRC release message comprises one or more of: a frequency associated with the secondary node; an SSB measurement time configuration (SMTC) associated with the secondary node; a cell level measurement configuration including threshold and maximum beam number to derive cell quality; a layer 3 beam level measurement configuration including threshold and maximum beam number for reporting; a cell quality threshold; a timer configured to control how long the user equipment can perform measurements in the inactive state; or a validity area. In some implementations, the RRC release message may further comprise an indication of whether the measurement configuration is configured for both an idle state and an inactive state, or only for an inactive state In some implementations, the validity area comprises a list of cell identifiers. In some implementations, the validity area comprises a list of RAN notification areas (RNAs). In some implementations, the validity area comprises a list of tracking areas (TAs).

In some implementations, the message comprising the measurement configuration (e.g., RRC release message or SIB message) further comprises one or more of: a subcarrier spacing of synchronization signal blocks (SSBs) to be measured; a bitmap of transmitted SSBs to be measured; an NR frequency band number; an SSB-RSSI measurement configuration; a beam measurement results validity timer; or one or more L3 filter coefficients.

In some implementations, the message comprising the measurement configuration comprises a system information broadcast (SIB) 4 message. In some implementations, the message comprising the measurement configuration comprises a system information broadcast (SIB) message with a periodicity shorter than a SIB4 message. For example, a SIB10 message may be used.

Method 1100 then proceeds to step 1104 with entering an inactive state.

Method 1100 then proceeds to step 1106 with performing measurements according to the measurement configuration for the secondary node immediately entering the inactive state. In some implementations, the user equipment performs measurements based on the received measurement configuration until a timer expires, such as a T331 timer.

Method 1100 then proceeds to step 1108 with generating a measurement report based on the measurements.

Method 1100 then proceeds to step 1110 with transmitting, to a second master node, an RRC resume request message.

In some implementations, the RRC resume request message comprises an in indication that the measurement report is available.

Method 1100 then proceeds to step 1112 with receiving, from the second master node, an RRC resume message comprising a request for measurement reporting.

Method 1100 then proceeds to step 1114 with transmitting, to the second master node, an RRC resume complete message comprising the measurement report.

Method 1100 then proceeds to step 1116 with receiving data from the secondary node.

Though not depicted in FIG. 11, in some implementations, method 1100 further comprises transmitting, to the second master node, a beam measurement report.

In some implementations, method 1100 further comprises: sending, to the master node, a preamble comprising a request for the SIB message prior to receiving the message comprising the SIB message.

In some implementations, method 1100 may further comprise deleting an existing measurement configuration and an existing measurement result after receiving the message comprising the measurement configuration for the secondary node from the first master node. This may occur, for example, before performing measurements according to the received measurement configuration in step 1106.

In some implementations, method 1100 may further comprise validating the measurements (e.g., performed at step 1106) based on the validity area (e.g., received with the measurement configuration at step 1102).

Figure 12:
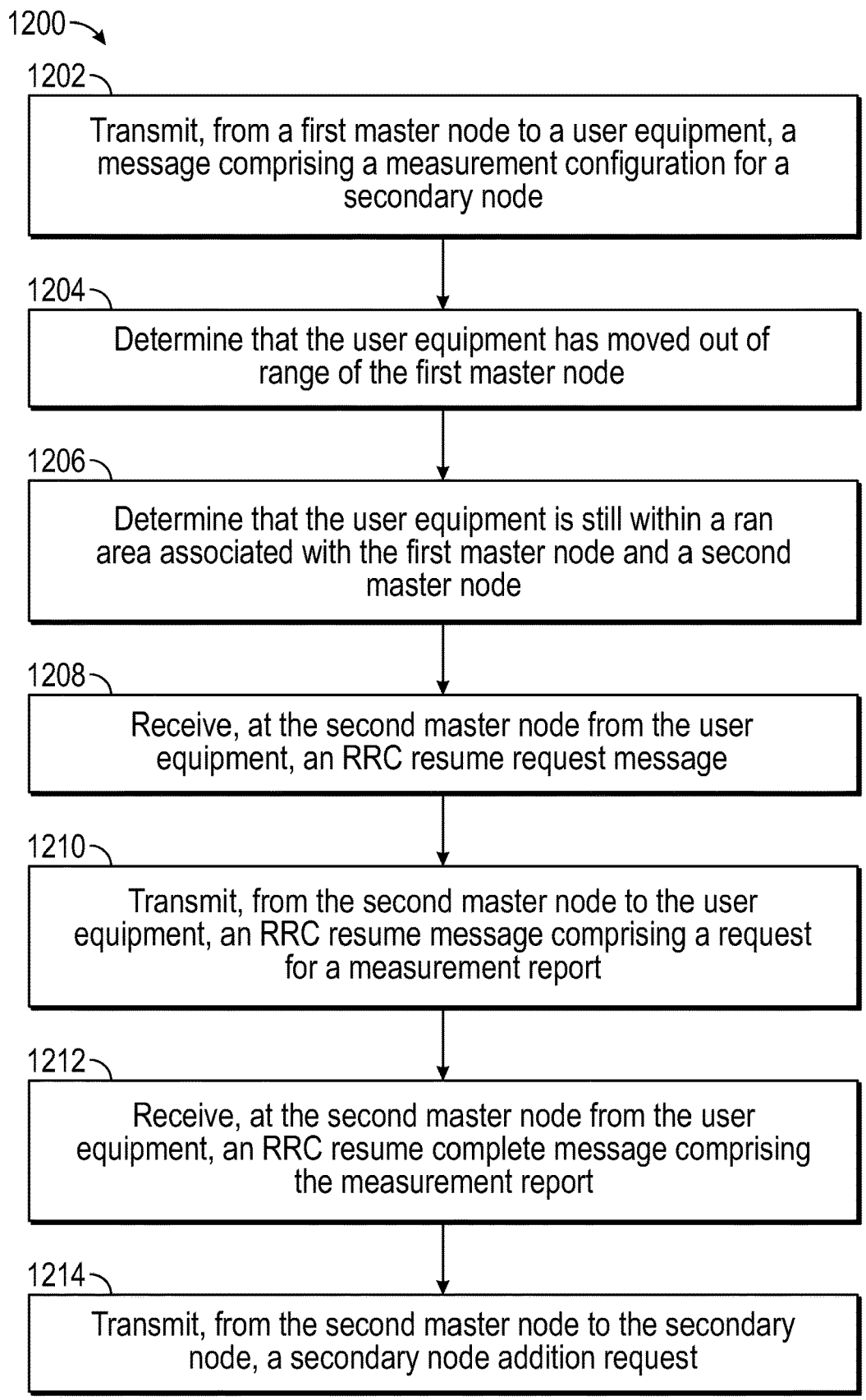
FIG. 12 depicts an example method for performing measurement reporting.

FIG. 12 depicts an example method 1200 for performing measurement reporting.

Method 1200 begins at step 1202 with transmitting, from a first master node to a user equipment, a message comprising a measurement configuration for a secondary node.

In some implementations, the message comprising the measurement configuration comprises a radio resource control (RRC) release message. In some implementations, the RRC release message comprises one or more of: a frequency associated with the secondary node; an SSB measurement time configuration (SMTC) associated with the secondary node; a cell level measurement configuration including threshold and maximum beam number to derive cell quality; a layer 3 beam level measurement configuration including threshold and maximum beam number for reporting; a cell quality threshold; a timer configured to control how long the user equipment can perform measurements in an inactive state; or a validity area. In some implementations, the RRC release message may further comprise an indication of whether the measurement configuration is configured for both an idle state and an inactive state, or only for an inactive state In some implementations, the validity area comprises a list of cell identifiers. In some implementations, the validity area comprises a list of RAN notification areas (RNAs). In some implementations, the validity area comprises a list of tracking areas (TAs).

In some implementations, the message comprising the measurement configuration (e.g., RRC release message or SIB message) further comprises one or more of: a subcarrier spacing of synchronization signal blocks (SSBs) to be measured; a bitmap of transmitted SSBs to be measured; an NR frequency band number; an SSB-RSSI measurement configuration; a beam measurement results validity timer; or one or more L3 filter coefficients.

In some implementations, the message comprising the measurement configuration comprises a system information broadcast (SIB) 4 message. In some implementations, the message comprising the measurement configuration comprises a system information broadcast (SIB) message with a periodicity shorter than a SIB4 message. For example, a SIB10 message may be used.

Method 1200 then proceeds to step 1204 with determining that the user equipment has moved out of range of the first master node MN. If out of range, the measurement configuration received in the RRC release message may be invalid for the new serving master node. In a conventional procedure, this may cause the UE to follow a new configuration procedure with the new serving master node.

Method 1200 then proceeds to step 1206 with determining that the user equipment is still within a RAN area associated with the first master node and a second master node. For example, the UE may determine whether it is still in RAN notification area (RNA) by checking whether the second master node is still in the configured validity area, which may be included with the RRC release message, such as described above.

Method 1200 then proceeds to step 1208 with receiving, at the second master node from the user equipment, an RRC resume request message.

In some implementations, the RRC resume request message comprises an in indication that the measurement report is available.

Method 1200 then proceeds to step 1210 with transmitting, from the second master node to the user equipment, an RRC resume message comprising a request for a measurement report.

Method 1200 then proceeds to step 1212 with receiving, at the second master node from the user equipment, an RRC resume complete message comprising the measurement report.

Method 1200 then proceeds to step 1214 with transmitting, from the second master node to the secondary node, a secondary node addition request.

Though not depicted in FIG. 12, in some implementations, the RRC resume request message comprises a user equipment identification, and method 1200 further comprises determining, based on the user equipment identification, that the user equipment supports early measurement reporting.

In some implementations, method 1200 further comprises receiving, at the second master node from the user equipment, a beam measurement report.

In some implementations, method 1200 further comprises transmitting, from the second master node to the first master node, a Retrieve UE Context Request message and receiving, at the second master node from the first master node, a Retrieve UE Context Response message including a measurement configuration for the secondary node.

In some implementations, method 1200 further comprises receiving, at the master node, a preamble comprising a request for the SIB message prior to transmitting the message comprising the SIB message.

Figure 13:
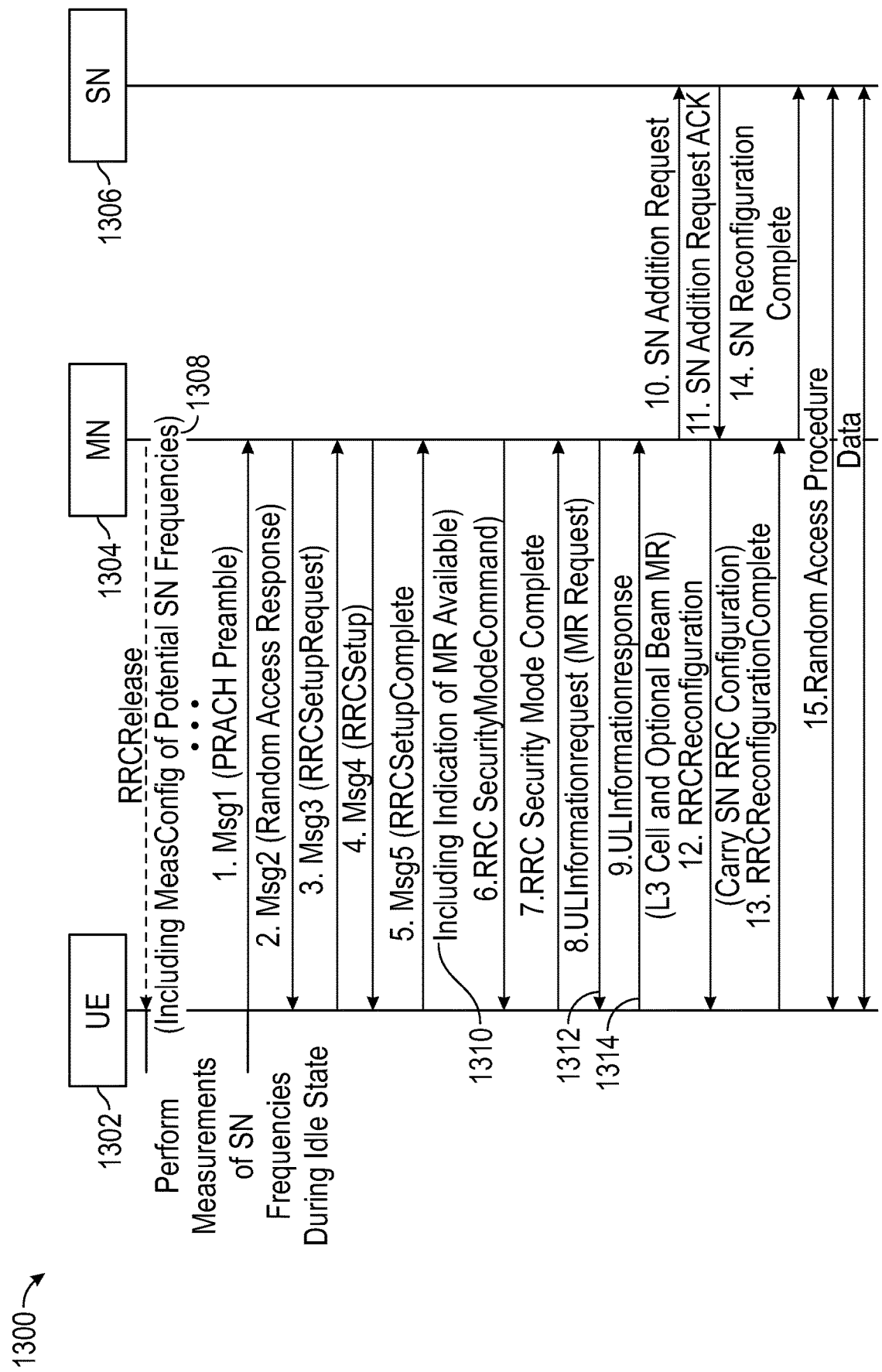
FIG. 13 depicts an example call flow of a method for performing measurement reporting.

FIG. 13 depicts an example call flow 1300 of a method for performing measurement reporting, as described above with respect to FIGS. 7 and 8.

As depicted, user equipment (UE) 1302 receives an RRC release message with a measurement configuration for potential secondary node (SN) frequencies at 1308. UE 1302 then enters an idle state and performs signal measurements.

Sometime later, UE 1302 exits the idle state and commences configuring a data connection with the network. At 1310, UE 1302 transmits an RRC Setup Complete message (message 5) to master node (MN) 1304, which indicates the availability of measurement reports.

At 1312, MN 1304 transmits an uplink information request (message 8) with a measurement report request. In response, at 1314, UE 1302 transmits an uplink information response that includes the measurement reports. Additionally, UE 1302 may include beam measurement reports in the same message.

UE 1304 then completes the data connection configuration procedure and begins receiving data from SN 1306.

Notably, in a conventional configuration, MN 1304 may have needed to wait until at least a tenth message that was triggered either by either the expiration of a reporting period or by an event at UE 1302 after UE 1402 exited the idle state. Thus, the depicted method reduces latency, reduces UE 1302's power usage, and reduces network overhead as compared to conventional methods.

Figure 14:
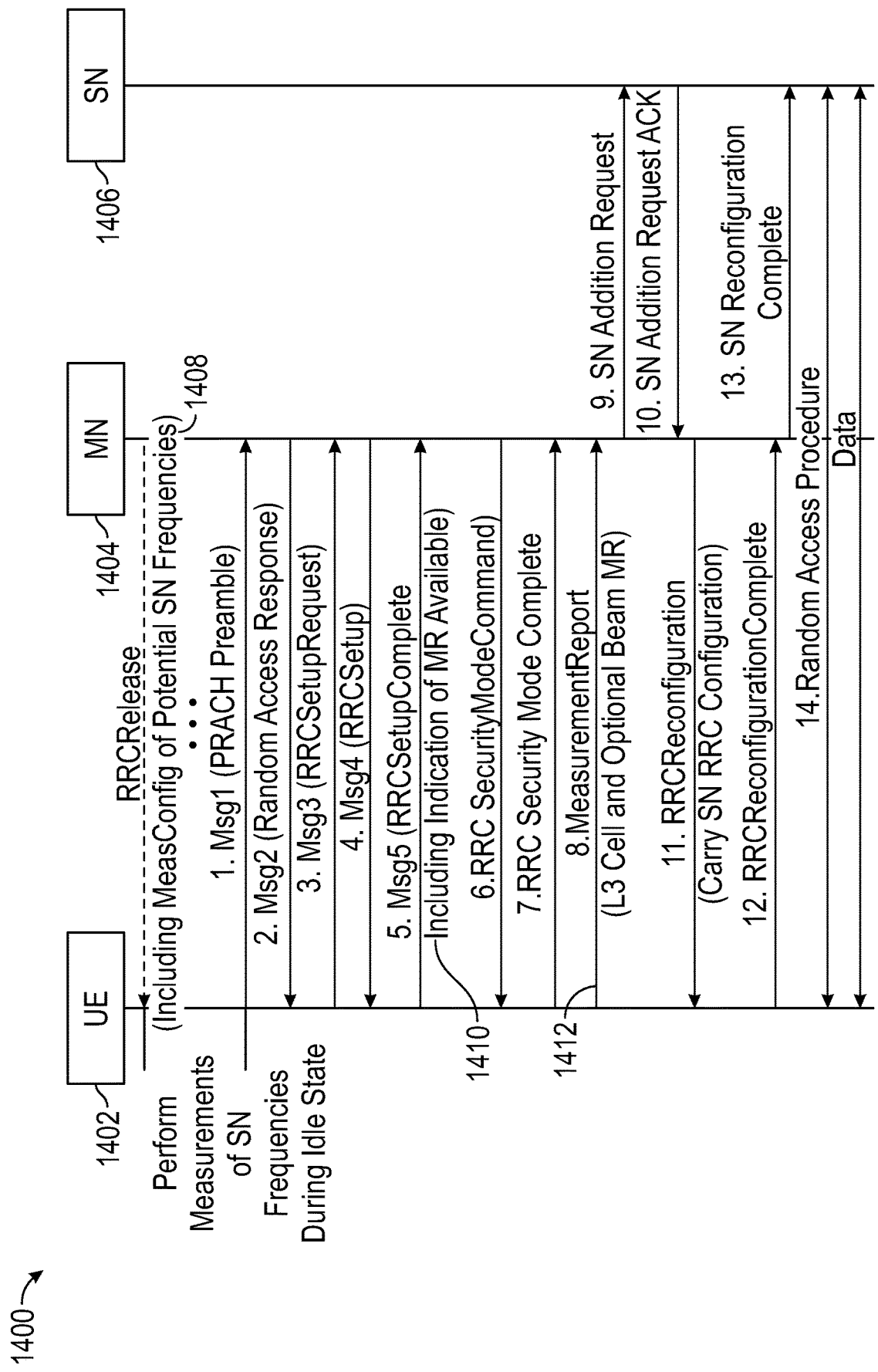
FIG. 14 depicts another example call flow of a method for performing measurement reporting.

FIG. 14 depicts another example call flow 1400 of a method for performing measurement reporting, as described above with respect to FIGS. 7 and 8.

As depicted, user equipment (UE) 1402 receives an RRC release message with a measurement configuration for potential secondary node (SN) frequencies at 1408. UE 1402 then enters an idle state and performs signal measurements.

Sometime later, UE 1402 exits the idle state and commences configuring a data connection with the network. At 1410, UE 1402 transmits an RRC Setup Complete message (message 5) to master node (MN) 1404, which indicates the availability of measurement reports.

Here, unlike in FIG. 13, UE 1402 transmits the measurement reports in message 8 at 1412.

UE 1404 then completes the data connection configuration procedure and begins receiving data from SN 1406.

As above, in a conventional configuration, MN 1404 may have needed to wait until at least a tenth message that was triggered either by either the expiration of a reporting period or by an event at UE 1402 after UE 1402 exited the idle state. Thus, here again, the depicted method reduces latency, reduces UE 1402's power usage, and reduces network overhead as compared to conventional methods.

Figure 15:
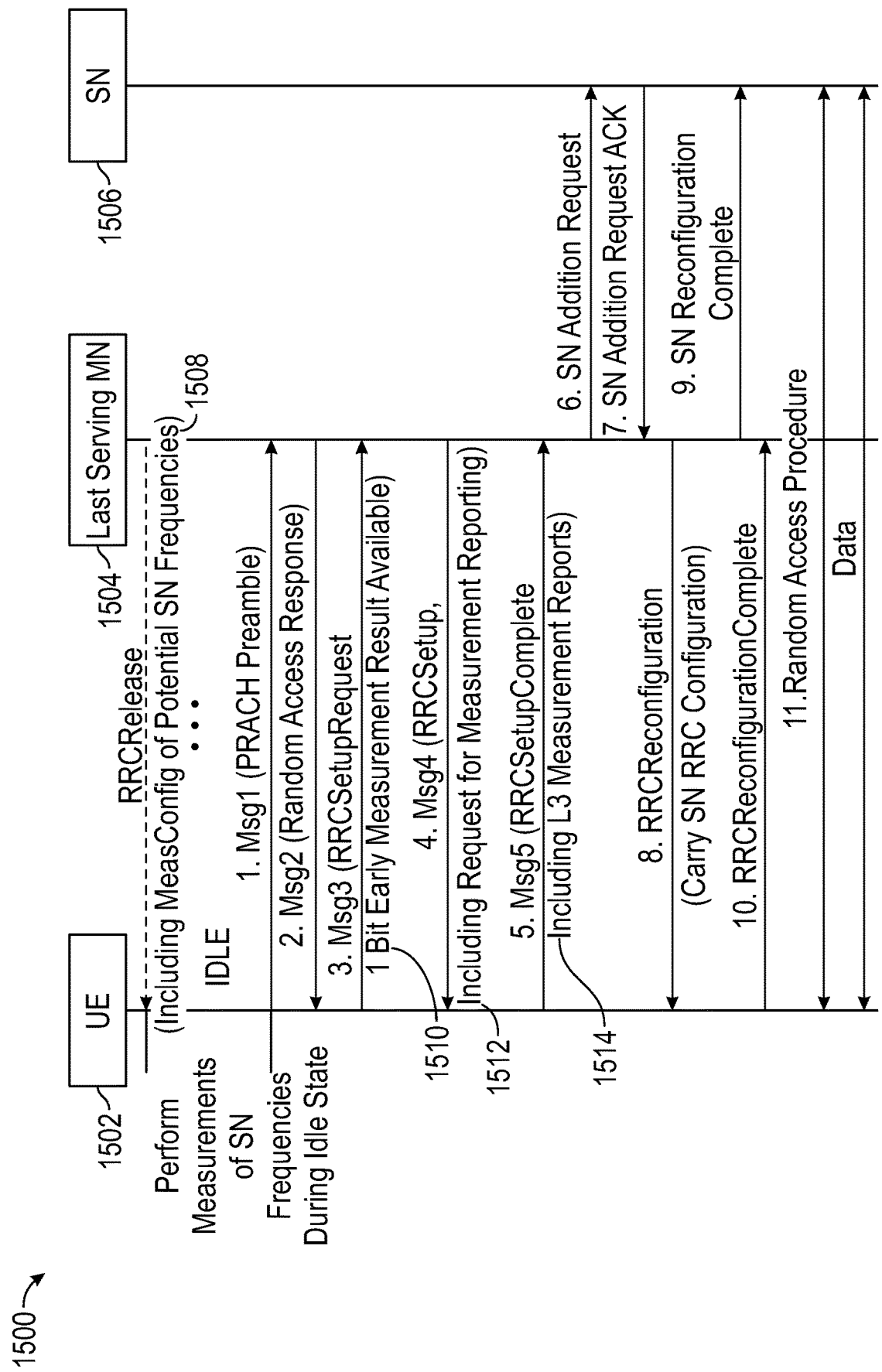
FIG. 15 depicts another example call flow 1500 of a method for performing measurement reporting

FIG. 15 depicts another example call flow 1500 of a method for performing measurement reporting, as described above with respect to FIGS. 7 and 8.

As depicted, user equipment (UE) 1502 receives an RRC release message with a measurement configuration for potential secondary node (SN) frequencies at 1508. UE 1502 then enters an idle state and performs signal measurements.

Sometime later, UE 1502 exits the idle state and commences configuring a data connection with the network. At 1510, UE 1502 transmits an RRC setup request message (message 3) to master node (MN) 1504, which indicates the availability of measurement reports. In this example, a single bit is used to indicate the availability of early measurement results At 1512, MN 1504 transmits an RRC setup message (message 4) including a request for the measurement reports). In response, UE 1502 transmits the measurement reports in an RRC setup complete message (message 5) at 1514.

UE 1504 then completes the data connection configuration procedure and begins receiving data from SN 1506.

As above, in a conventional configuration, MN 1504 may have needed to wait until at least a tenth message that was triggered either by the expiration of a reporting period or by an event at UE 1502 after UE 1502 exited the idle state. Thus, here again, the depicted method reduces latency, reduces UE 1502's power usage, and reduces network overhead as compared to conventional methods.

Figure 16:
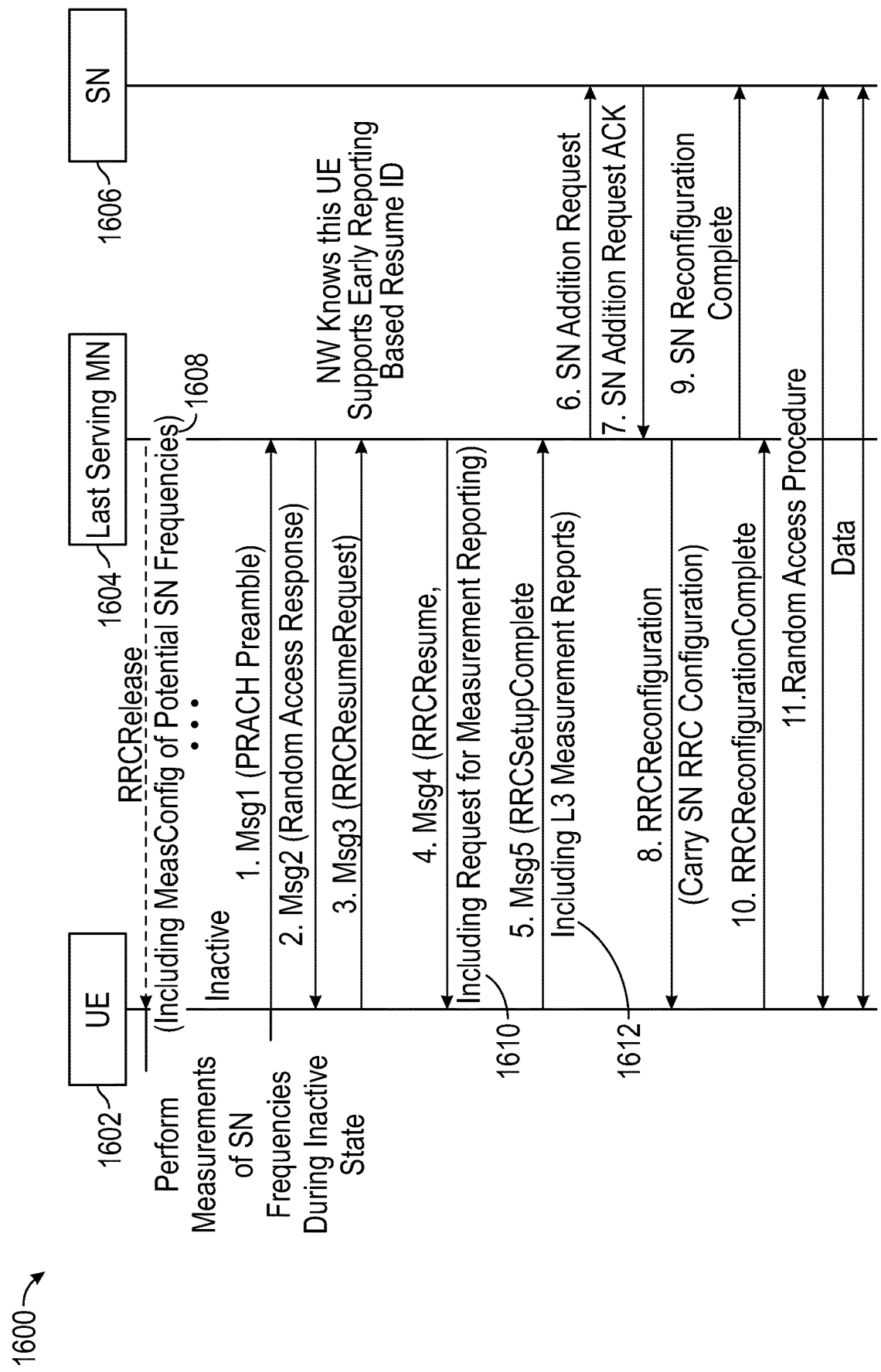
FIG. 16 depicts another example call flow of a method for performing measurement reporting.

FIG. 16 depicts an example call flow 1600 of a method for performing measurement reporting, as described above with respect to FIGS. 9 and 10.

As depicted, user equipment (UE) 1602 receives an RRC release message with a measurement configuration for potential secondary node (SN) frequencies at 1608. UE 1602 then enters an inactive state and performs signal measurements.

Sometime later, UE 1602 exits the inactive state and commences configuring a data connection with the network. At 1610, UE 1602 receives an RRC resume message (message 4) from master node (MN) 1604 comprising a request for a measurement reporting.

At 1612, UE 1602 respond with an RRC resume complete message (message 5), which includes the measurements captured during the inactive state.

UE 1605 then completes the data connection configuration procedure and begins receiving data from SN 1606.

Notably, in a conventional configuration, MN 1604 may have needed to wait until at least an eighth message to receive measurement reports from UE 1602 after exiting an inactive state. Thus, the depicted method reduces latency, reduces UE 1602's power usage, and reduces network overhead as compared to conventional methods.

Figure 17:
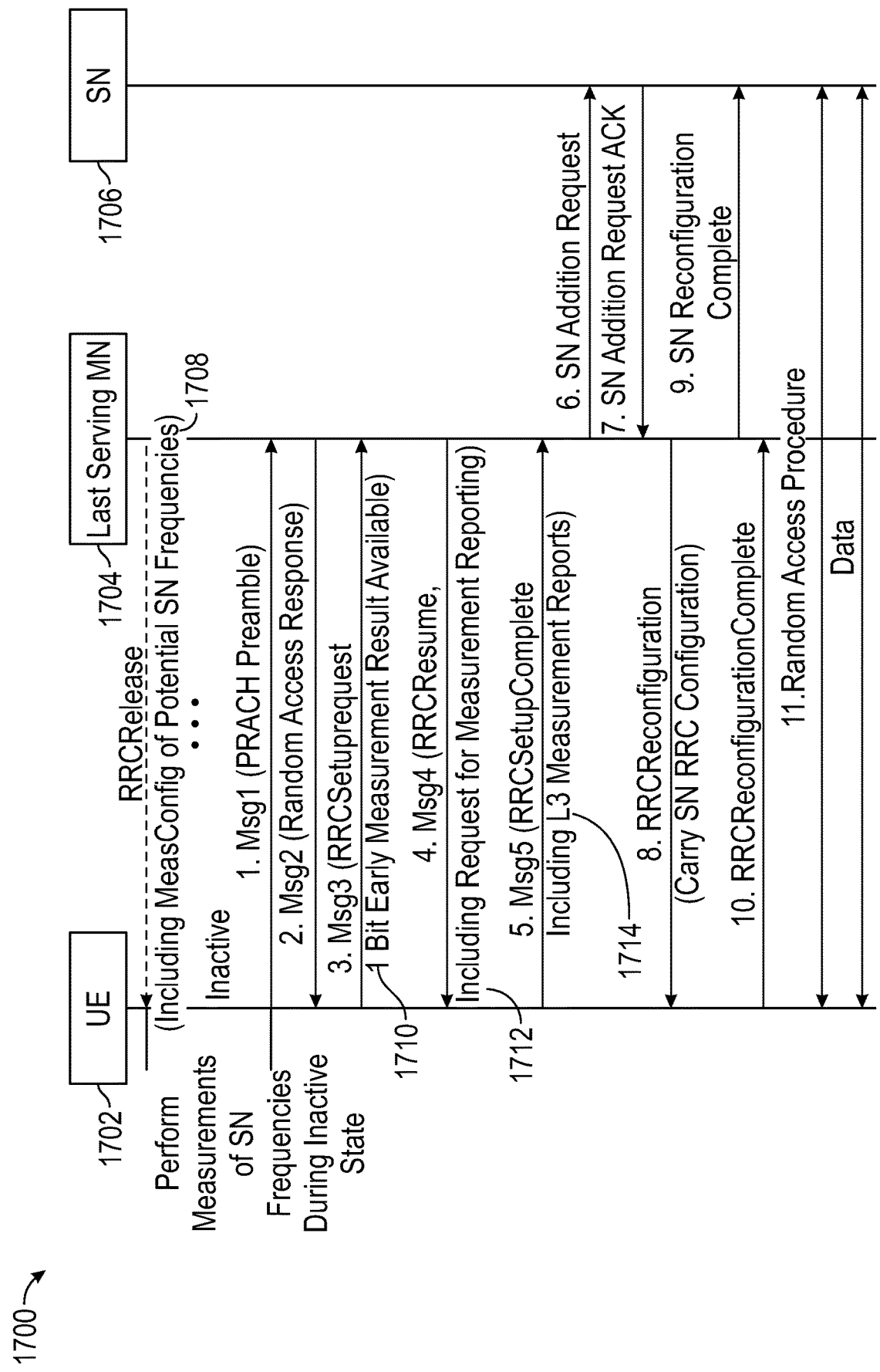
FIG. 17 depicts another example call flow of a method for performing measurement reporting.

FIG. 17 depicts another example call flow 1700 of a method for performing measurement reporting, as described above with respect to FIGS. 9 and 10.

As depicted, user equipment (UE) 1702 receives an RRC release message with a measurement configuration for potential secondary node (SN) frequencies at 1708. UE 1702 then enters an inactive state and performs signal measurements.

Sometime later, UE 1702 exits the inactive state and commences configuring a data connection with the network. At 1710, UE 1702 transmits to master node (MN) 1704 an RRC resume request (message 3) with a 1 bit indication that early measurement results are available. In response, at 1712 MN 1704 transmits an RRC resume message (message 4) including a request for the early measurement reporting. In response, at 1714 UE 1702 transmits an RRC resume complete message (message 5) including the measurement reports.

UE 1704 then completes the data connection configuration procedure and begins receiving data from SN 1706.

As above, in a conventional configuration, MN 1704 may have needed to wait until at least an eighth message to receive measurement reports from UE 1702 after exiting an inactive state. Thus, the depicted method reduces latency, reduces UE 1702's power usage, and reduces network overhead as compared to conventional methods.

Figure 18:
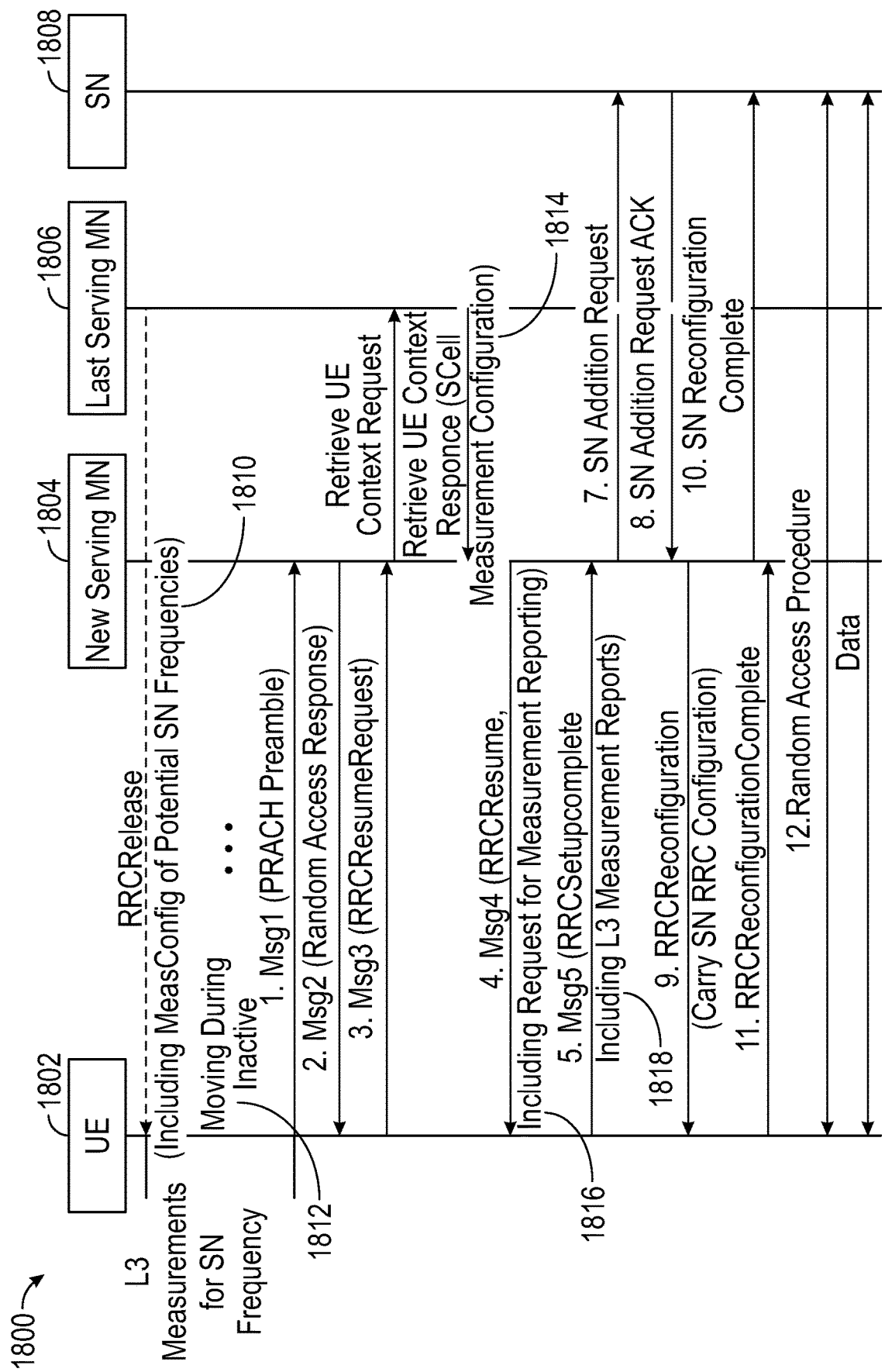
FIG. 18 depicts another example call flow of a method for performing measurement reporting.

FIG. 18 depicts another example call flow 1800 of a method for performing measurement reporting, as described above with respect to FIG. 11.

As depicted, user equipment (UE) 1802 receives, from last serving master node 1806, an RRC release message with a measurement configuration for potential secondary node (SN) frequencies at 1810. UE 1802 then enters an inactive state and performs signal measurements.

Sometime later, UE 1802 exits the inactive state and commences configuring a data connection with the network.

Notably, in this example, UE 1802 was moving while in the inactive state. Thus, when UE 1802 exits the inactive state, the last serving master node (MN) 1806 is no longer the best node for UE 1802 (e.g., based on range, signal quality, etc.). Rather, the new serving MN 1804 is preferred by UE 1802. However, in this example, last serving MN 1806 and new serving MN 1804 are in the same RAN area, thus new serving MN 1804 is able to request and the retrieve the measurement configuration originally sent to UE 1802 (at step 1810) at step 1814.

This exchange of measurement configuration data allows new serving MN 1804 to then request the measurement reporting in an RRC resume message (message 4) at 1816, as in earlier examples. In response, at 1818 UE 1802 transmits an RRC resume complete message (message 5) to new serving MN 1804 including the measurement reports.

UE 1804 then completes the data connection configuration procedure and begins receiving data from SN 1808.

As above, in a conventional configuration, new serving MN 1804 may have needed to wait until at least an eighth message to receive measurement reports from UE 1802 after exiting an inactive state. Thus, the depicted method reduces latency, reduces UE 1802's power usage, and reduces network overhead as compared to conventional methods.

Example User Equipment Behaviors During State Transitions

Figure 19:
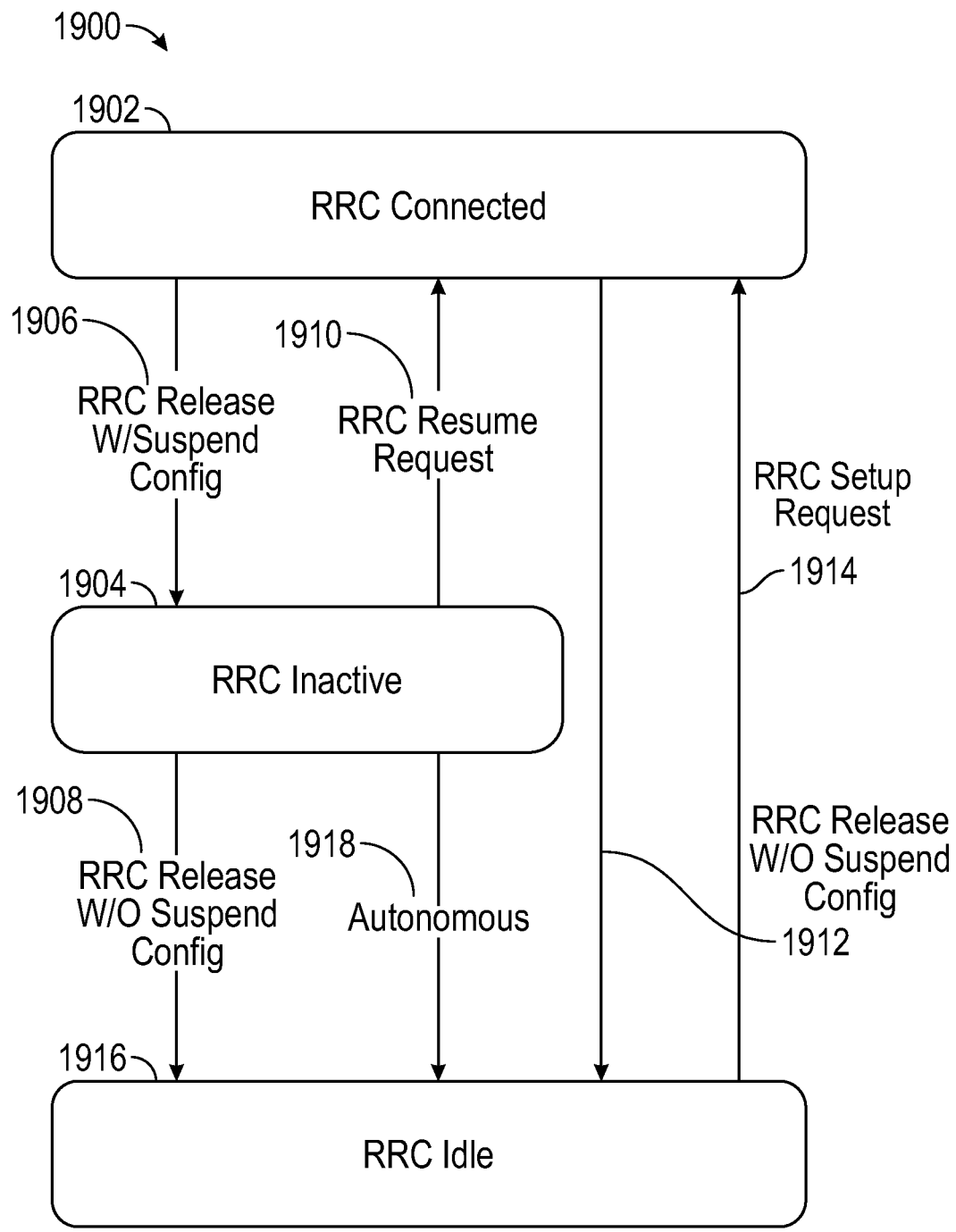
FIG. 19 depicts example user equipment behaviors during state transitions.

FIG. 19 depicts example UE behaviors during state transitions, such as between RRC Connected, RRC Inactive, and RRC Idle states.

In a first example, a UE may start in RRC Connected state 1902 and receive an RRC Release message with a suspend configuration at 1906, which causes the UE to enter RRC Inactive state 1904. As discussed above with respect to FIGS. 7-18, the UE may receive a new early measurement configuration in the RRC Release message at 1906.

In response to receipt of the new early measurement configuration with the RRC Release message at 1906, the UE may delete any previous early measurement configurations and any associated results. Thereafter, the UE may perform measurements with the new early measurement configuration included in the RRC Release message until, for example, a timer, such as the T331 timer, expires.

The UE may then transmit an RRC Resume Request message at 1910 and proceed to enter RRC Connected state 1902, for example, as discussed above and depicted with respect to FIGS. 9, 10, 11, 12, 16, 17, and 18. When the UE reenters RRC Connected state 1902, it may validate its early measurement results with a latest received validity area and then proceed to delete its current early measurement configuration.

In a second example, the UE may start in RRC Connected state 1902 and receive an RRC Release message without a suspend configuration at 1912, which causes the UE to enter RRC Idle state 1916. As discussed above with respect to FIGS. 7-18, the UE may receive a new early measurement configuration in the RRC Release message at 1912.

In response to receipt of the new early measurement configuration with the RRC release message at 1912, the UE may likewise delete any previous early measurement configurations and any associated results. And thereafter, the UE may perform measurements with the new early measurement configuration included in the RRC Release message until, for example, a timer, such as the T331 timer, expires.

The UE may then transmit an RRC Setup Request message at 1914 and proceed to enter RRC connected state 1902, for example, as discussed above and depicted with respect to FIGS. 7, 8, 13, 14, 15. When the UE reenters RRC Connected state 1902, it may validate its early measurement results with a latest received validity area and then proceed to delete its current early measurement configuration.

In a third example, the UE may reselect to a new cell with another radio access technology (RAT). As discussed above with respect to FIGS. 7-18, the UE may receive a new early measurement configuration in an RRC Release message as part of the reselection process. Further, the RRC Release message may include a suspend configuration (e.g., at 1906) indicating whether the early measurement configuration for the UE is applicable to both RRC Inactive state 1904 and RRC Idle state 1916, or just to RRC Inactive state 1904. Thereafter, if the UE enters RRC Idles state 1916 autonomously, such as shown at 1918, and the RRC Release message (e.g., at 1906) indicated that the early measurement configuration is for RRC Inactive state 1904 only, then the UE may delete the stored early measurement configuration results received in the RRC Release message at 1906.

Note that aspects described with respect to FIG. 19 may be combined with the methods described above with respect to FIGS. 7-12 and flows described above with respect to FIGS. 13-18.

Example Method for User Equipment State Transitions

Figure 20:
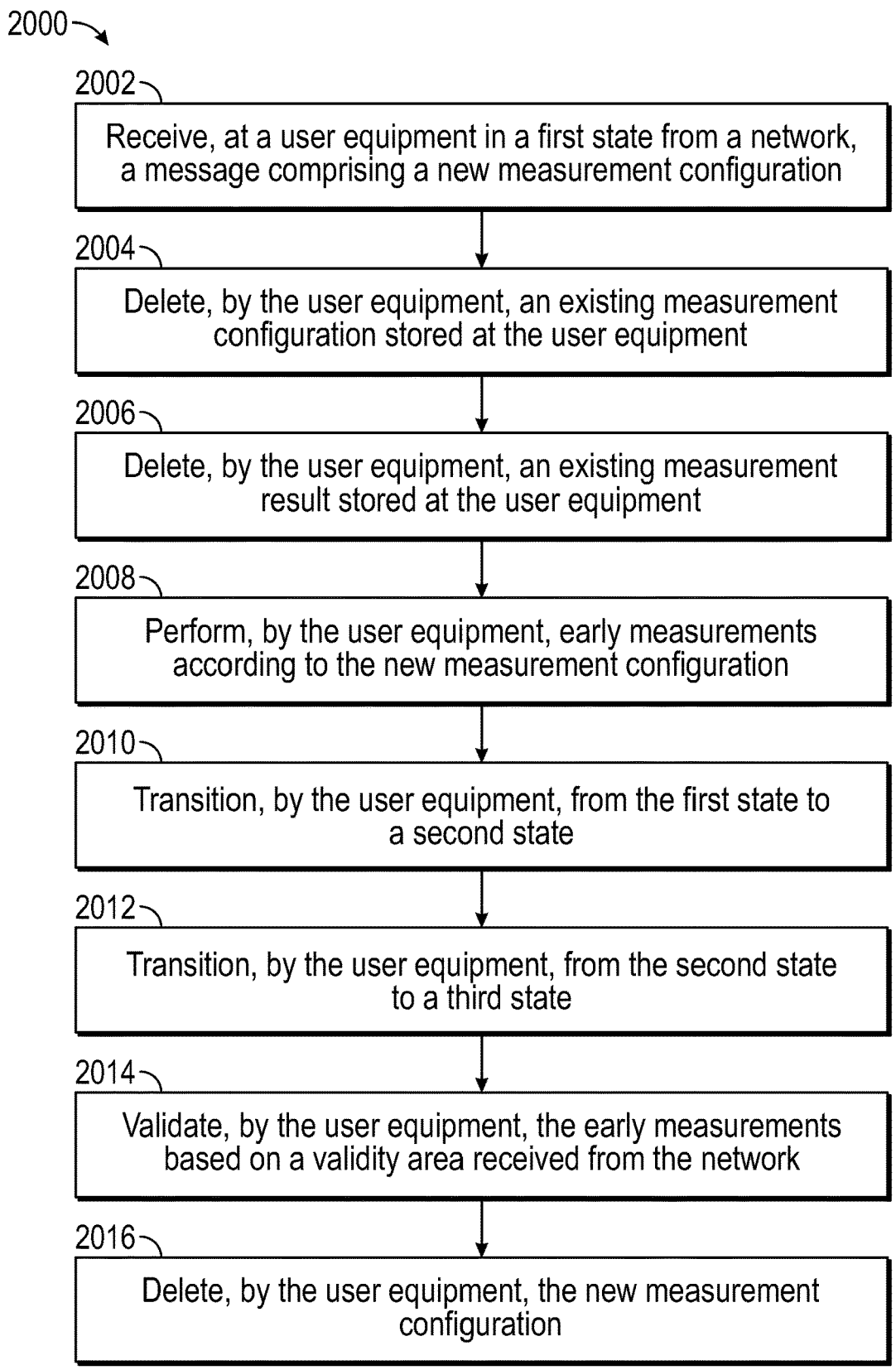
FIG. 20 depicts an example method for user equipment state transitions.

FIG. 20 depicts an example method 2000 for user equipment state transitions.

Method 2000 begins at step 2002 with receiving, at a user equipment in a first state from a network, a message comprising a new measurement configuration.

In some implementations, the message comprising the new measurement configuration is an RRC Release message, such as described above with respect to FIGS. 7-19.

In some implementations, the new measurement configuration is configured for multi-radio access technology dual connectivity (MRDC). In some implementations, the new measurement configuration may be configured for E-UTRA-NR Dual Connectivity (EN-DC), NR-E-UTRA Dual Connectivity (NE-DC), or NR-NR Dual Connectivity (NR-NR). For example, the new measurement configuration may comprise a first new measurement configuration for a 4G radio access technology (e.g., LTE) and a second new measurement configuration for a 5G radio access technology (e.g., NR.). In dual connectivity scenarios, a secondary node may forward its early measurement configuration to the master node via an inter-node RRC message.

In some implementations, the first state is an RRC Connected state, such as described above with respect to FIG. 19.

Method 2000 then proceeds to step 2004 with deleting, by the user equipment, an existing measurement configuration stored at the user equipment.

Method 2000 then proceeds to step 2006 with deleting, by the user equipment, an existing measurement result stored at the user equipment.

Method 2000 then proceeds to step 2008 with performing, by the user equipment, early measurements according to the new measurement configuration.

In some implementations, the user equipment performs the early measurements according to the new measurement configuration until the expiration of a timer. In some implementations, the timer is a T331 timer.

Method 2000 then proceeds to step 2010 with transitioning, by the user equipment, from the first state to a second state.

In some implementations, the second state is an RRC Inactive state or an RRC Idle state, such as described above with respect to FIG. 19.

Method 2000 then proceeds to step 2012 with transitioning, by the user equipment, from the second state to a third state.

In some implementations, the third state is the RRC Connected state. Thus, in some implementations, the third state is the same as the first state.

Method 2000 then proceeds to step 2014 with validating, by the user equipment, the early measurements based on a validity are received from the network.

In some implementations, the validity area is received with the message comprising the new measurement configuration.

Method 2000 then proceeds to step 2016 with deleting, by the user equipment, the new measurement configuration.

Though not depicted in FIG. 20, method 2000 may further comprise transmitting, by the user equipment to the network, a connection request message. In some implementations, the connection request message is one of an RRC Resume Request message or an RRC Setup Request message.

In some implementations, the first state is an RRC Connected state, the second state is an RRC Inactive state, and the third state is an RRC Idle state, such as described above with respect to FIG. 19. Thus, in some implementations, the third state is different from the first state. In such implementations, transitioning, by the user equipment, from the second state to the third state at step 2012 may be performed by the user equipment autonomously. In such implementations, the message comprising the new measurement configuration in step 2002 further comprises an indication of whether the new measurement configuration is valid for an RRC Inactive state and an RRC Idle state, or only the RRC Inactive state. In such implementations, method 2000 may further comprise deleting, by the user equipment, the new measurement configuration received at step 2002.

Note that aspects of method 2000 may be combined with the methods described above with respect to FIGS. 7-12.

Example Communication Device

Figure 21:
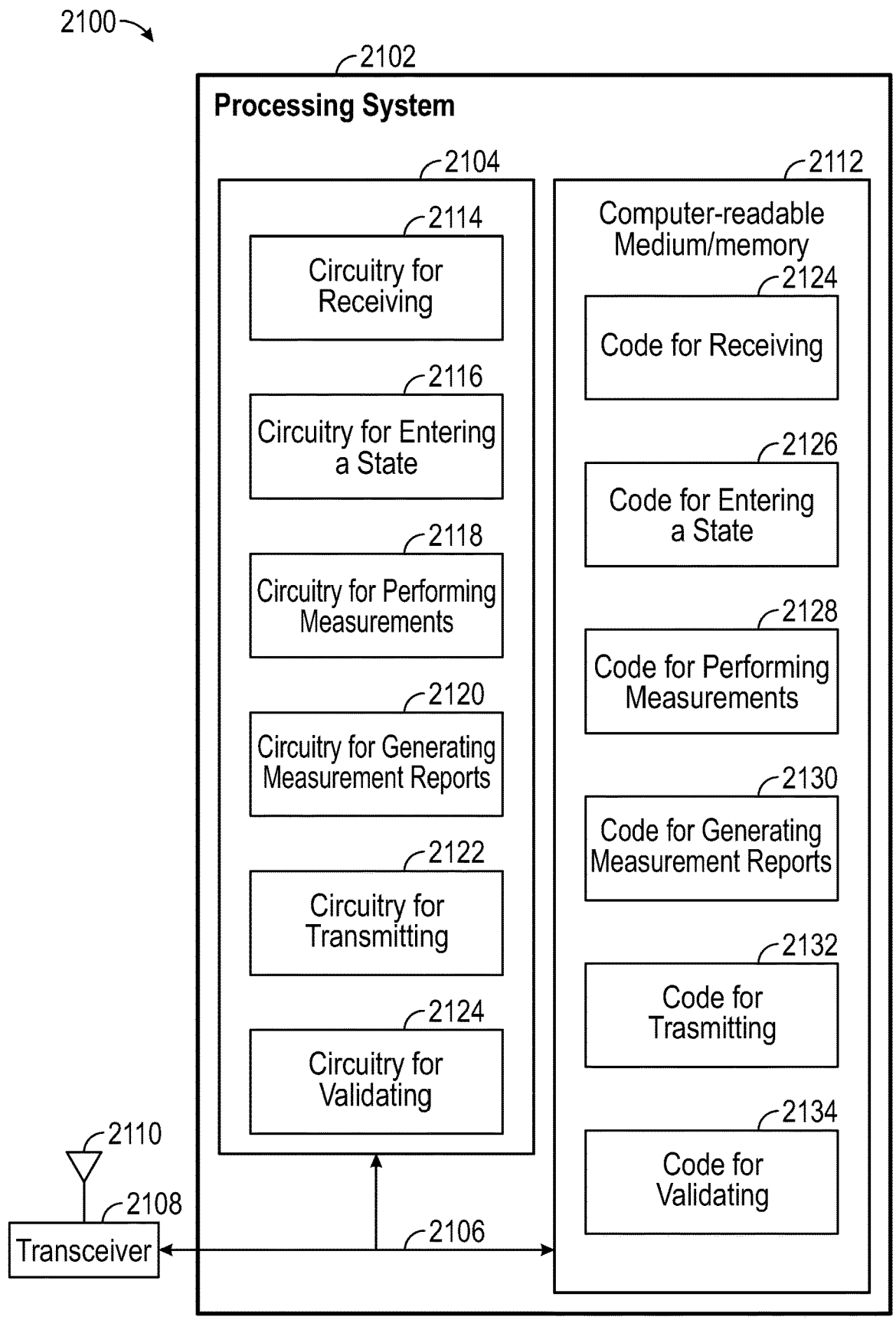
FIG. 21 illustrates a communications device that may include various components configured to perform operations for the techniques disclosed herein in accordance with aspects of the present disclosure.

FIG. 21 illustrates a communications device 2100 that may include various components (e.g., corresponding to means-plus-function components) configured to perform operations for the techniques disclosed herein, such as the operations illustrated in FIGS. 7-20.

In this example, the communications device 2100 includes a processing system 2102 coupled to a transceiver 2108. The transceiver 2108 is configured to transmit and receive signals for the communications device 2100 via an antenna 2110, such as the various signal described herein. The processing system 2102 may be configured to perform processing functions for the communications device 2100, including processing signals received and/or to be transmitted by the communications device 2100.

The processing system 2102 includes a processor 2104 coupled to a computer-readable medium/memory 2112 via a bus 2106. In certain aspects, the computer-readable medium/memory 2112 is configured to store instructions that when executed by processor 2104, cause the processor 2104 to perform the operations illustrated in FIGS. 7-20, or other operations for performing the various techniques discussed herein.

In certain aspects, the processing system 2102 further includes one or more of circuitry for receiving 2114, circuitry for entering a state 2116, circuitry for performing measurements 2118, circuitry for generating measurement reports 2120, circuitry for transmitting 2122, and circuitry for validating. Processing system 2102 may further include, within memory 2112, one or more of: code for receiving 2124, code for entering a state 2126, code for performing measurements 2128, code for generating measurement reports 2130, code for transmitting 2132, and code for validating 2134. The various circuitry elements and code elements depicted in FIG. 21 may be configured to perform the methods described above with respect to FIGS. 7-20. Note, though, that FIG. 21 is just one example, and other processing systems are possible, including more or fewer components, which may likewise be configured for performing the methods described above with respect to FIGS. 7-20.

ADDITIONAL CONSIDERATIONS

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-20.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for performing measurement reporting at a user equipment, comprising:
    receiving, from a master node, a message comprising a measurement configuration for a secondary node;
    entering an inactive state;
    performing measurements according to the measurement configuration for the secondary node immediately after entering the inactive state;
    generating a measurement report based on the measurements;
    transmitting, to the master node, a radio resource control (RRC) resume request message;
    receiving, from the master node, an RRC resume message comprising a request for measurement reporting;
    transmitting, to the master node, an RRC resume complete message comprising the measurement report; and
    receiving data from the secondary node.

2. The method of claim 1, wherein the RRC resume request message comprises an indication that the measurement report is available.

3. The method of claim 1, further comprising: transmitting, to the master node, a beam measurement report.

4. The method of claim 1, wherein the message comprising the measurement configuration comprises an RRC release message.

5. The method of claim 4, wherein the RRC release message comprises:
    a frequency associated with the secondary node;
    a synchronization signal blocks (SSB) measurement time configuration (SMTC) associated with the secondary node;
    a cell level measurement configuration including threshold and maximum beam number to derive cell quality;
    a layer 3 beam level measurement configuration including threshold and maximum beam number for reporting;
    a cell quality threshold;
    a timer configured to control how long the user equipment can perform measurements in the inactive state; and
    a validity area.

6. The method of claim 5, wherein the RRC release message further comprises one or more of:
    a subcarrier spacing of SSBs to be measured;
    a bitmap of transmitted SSBs to be measured;
    an NR frequency band number; or an SSB-received signal strength indicator (RSSI) measurement configuration.

7. The method of claim 6, wherein the RRC release message further comprises one or more of:
   a beam measurement results validity timer configured to control how long measured beam measurement results are kept; or one or more layer 3 (L3) filter coefficients.

8. The method of claim 5, wherein the validity area comprises a list of cell identifiers.

9. The method of claim 5, wherein the validity area comprises a list of radio access network (RAN) notification areas (RNAs).

10. The method of claim 5, wherein the validity area comprises a list of tracking areas (TAS).

11. The method of claim 1, wherein the message comprising the measurement configuration comprises a system information broadcast (SIB) 4 message.

12. The method of claim 1, wherein the message comprising the measurement configuration comprises a system information broadcast (SIB) message with a periodicity shorter than a SIB4 message.

13. The method of claim 12, further comprising: sending, to the master node, a preamble comprising a request for the SIB message prior to receiving the message comprising the SIB message.

14. A user equipment configured to perform measurement reporting, comprising:
   a memory comprising instructions;
   one or more processors, individually or collectively, configured to execute the instructions and cause the user equipment to:
      receive, from a master node, a message comprising a measurement configuration for a secondary node;
      enter an inactive state;
      perform measurements according to the measurement configuration for the secondary node immediately after entering the inactive state;
      generate a measurement report based on the measurements;
      transmit, to the master node, a radio resource control (RRC) resume request message;
      receive, from the master node, an RRC resume message comprising a request for measurement reporting;
      transmit, to the master node, an RRC resume complete message comprising the measurement report; and
      receive data from the secondary node.

15. The user equipment of claim 14, wherein the RRC resume request message comprises an indication that the measurement report is available.

16. The user equipment of claim 14, wherein the one or more processors are, individually or collectively, configured to execute the instructions and cause the user equipment to: transmit, to the master node, a beam measurement report.

17. The user equipment of claim 1, wherein the message comprising the measurement configuration comprises an RRC release message.

18. The user equipment of claim 17, wherein the RRC release message comprises:
   a frequency associated with the secondary node;
   a synchronization signal blocks (SSB) measurement time configuration (SMTC) associated with the secondary node;
   a cell level measurement configuration including threshold and maximum beam number to derive cell quality;
   a layer 3 beam level measurement configuration including threshold and maximum beam number for reporting;
   a cell quality threshold;
   a timer configured to control how long the user equipment can perform measurements in the inactive state; and
   a validity area.

19. The user equipment of claim 18, wherein the RRC release message further comprises one or more of:
   a subcarrier spacing of SSBs to be measured;
   a bitmap of transmitted SSBs to be measured;
   an NR frequency band number; or
   an SSB-received signal strength indicator (RSSI) measurement configuration.

20. The user equipment of claim 19, wherein the RRC release message further comprises one or more of:
   a beam measurement results validity timer configured to control how long measured beam measurement results are kept; or one or more layer 3 (L3) filter coefficients.

21. The user equipment of claim 18, wherein the validity area comprises a list of cell identifiers.

22. The user equipment of claim 18, wherein the validity area comprises a list of radio access network (RAN) notification areas (RNAs).

23. The user equipment of claim 18 wherein the validity area comprises a list of tracking areas (TAs).

24. The user equipment of claim 14, wherein the message comprising the measurement configuration comprises a system information broadcast (SIB) 4 message.

25. The user equipment of claim 14, wherein the message comprising the measurement configuration comprises a system information broadcast (SIB) message with a periodicity shorter than a SIB4 message.

26. The user equipment of claim 25, wherein the one or more processors are, individually or collectively, configured to execute the instructions and cause the user equipment to: send, to the master node, a preamble comprising a request for the SIB message prior to receiving the message comprising the SIB message.

27. A user equipment configured to perform measurement reporting, comprising:
   means for receiving, from a master node, a message comprising a measurement configuration for a secondary node;
   means for entering an inactive state;
   means for performing measurements according to the measurement configuration for the secondary node immediately entering the inactive state;
   means for generating a measurement report based on the measurements;
   means for transmitting, to the master node, a radio resource control (RRC) resume request message;
   means for receiving, from the master node, an RRC resume message comprising a request for measurement reporting;
   means for transmitting, to the master node, an RRC resume complete message comprising the measurement report; and
   means for receiving data from the secondary node.

28. The user equipment of claim 27, wherein the RRC resume request message comprises an indication that the measurement report is available.

29. A non-transitory computer-readable medium comprising computer-executable instructions that, when executed by one or more processors of a user equipment, cause the user equipment to perform a method for performing measurement reporting, the method comprising:
   receiving, from a master node, a message comprising a measurement configuration for a secondary node;
   entering an inactive state;
   performing measurements according to the measurement configuration for the secondary node immediately after entering the inactive state;

generating a measurement report based on the measurements;
transmitting, to the master node, a radio resource control (RRC) resume request message;
receiving, from the master node, an RRC resume message comprising a request for measurement reporting;
transmitting, to the master node, an RRC resume complete message comprising the measurement report; and
receiving data from the secondary node.

30. The non-transitory computer-readable medium of claim 29, wherein the RRC resume request message comprises an indication that the measurement report is available.

\* \* \* \* \*